(12) United States Patent
Payne

(10) Patent No.: US 12,301,614 B1
(45) Date of Patent: May 13, 2025

(54) OFFENSIVE CYBERSECURITY APPLIANCE

(71) Applicant: Orville Payne, Cinnaminson, NJ (US)

(72) Inventor: Orville Payne, Cinnaminson, NJ (US)

(*) Notice: Subject to any disclaimer, the term of this patent is extended or adjusted under 35 U.S.C. 154(b) by 10 days.

(21) Appl. No.: 18/122,953

(22) Filed: Mar. 17, 2023

(51) Int. Cl.
*H04L 9/00* (2022.01)
*H04L 9/40* (2022.01)

(52) U.S. Cl.
CPC ...... *H04L 63/1441* (2013.01); *H04L 63/1408* (2013.01); *H04L 63/1416* (2013.01); *H04L 63/1425* (2013.01); *H04L 63/1433* (2013.01); *H04L 63/145* (2013.01); *H04L 63/1458* (2013.01); *H04L 63/1466* (2013.01); *H04L 63/1483* (2013.01); *H04L 63/1491* (2013.01); *H04L 63/20* (2013.01)

(58) Field of Classification Search
CPC ............ H04L 63/1441; H04L 63/1408; H04L 63/1443
USPC .......................................................... 726/22
See application file for complete search history.

(56) References Cited

U.S. PATENT DOCUMENTS

| | | | | |
|---|---|---|---|---|
| 7,089,303 | B2* | 8/2006 | Sheymov | H04L 63/1408 709/224 |
| 2014/0237599 | A1* | 8/2014 | Gertner | H04L 63/1425 726/24 |
| 2015/0047032 | A1* | 2/2015 | Hannis | H04L 63/1491 726/23 |
| 2020/0380117 | A1* | 12/2020 | Marwah | H04L 63/1425 |
| 2021/0097182 | A1* | 4/2021 | Strogov | G06F 21/566 |
| 2022/0012331 | A1* | 1/2022 | Ahmed | H04L 63/1408 |
| 2022/0030022 | A1* | 1/2022 | Keith, Jr. | H04L 9/0866 |

* cited by examiner

*Primary Examiner* — Christopher J Brown
(74) *Attorney, Agent, or Firm* — William J. Benman; Benman, Brown & Williams

(57) ABSTRACT

An artificial intelligence based Offensive Cybersecurity Appliance or OCA for launching a cyber-offensive countermeasure aimed at effectively mitigating sophisticated cyber threats such as real-time Ransomware as a Service (RaaS) directives and emergent killware instigated by malicious-threat actors or cyber attackers. The system covertly uses a vast array of penetrative counter cyber attacks, based on an Advanced Persistent Threat or APT model, to circumvent encountered information security controls instituted by security-based components of a cyber attacker's Local Area Network or LAN. Intrinsically, the penetrative counter cyber attacks are constituted of multiple blended artificial intelligence based cyber attacks. The OCA subsequently uses these blended artificial intelligence based cyber attacks to render the hardware (including the cyber attacker's computer system used to instigate the cyber attack, discovered peripheral smart devices, and network-edge device such as a modem-router) interconnected to the cyber attacker's LAN inoperable by destroying the electronic components associated with that hardware.

5 Claims, 12 Drawing Sheets

OFFENSIVE CYBERSECURITY APPLIANCE

BACKGROUND OF THE INVENTION

Field of the Invention

The present invention relates to cybersecurity hardware. More specifically, the present invention relates to hardware-based systems for protecting computers from unauthorized access.

Description of the Related Art

Current information security strategies have limited efficacy at deterring cybercriminals and mitigating the proliferation of cyber threats (i.e., the risk of experiencing a cyber attack) instigated by malicious-threat actors such as real-time Ransomware as a Service (RaaS) directives and emergent kill-ware.

Prior approaches for addressing and mitigating such cybercriminal activities are typically based on the Layered-Defense and Defense-in-Depth strategies, which are widely recognized and accepted by the information security industry. In addition, the Layered-Defense and Defense-in-Depth strategies are principally used to facilitate multiple redundant defensive measures that are used to shield or defend data and information processing assets from malware and other nefarious cyber threats posed by malicious actors.

Layered-Defense and Defense-in-Depth strategies are generally categorized into four types of information security controls. These controls are principally used to dynamically mitigate information-security risks such as breaches to network infrastructures. They are comprised of the following information security controls: 1) Physical or access controls such as restrictions on physical access (e.g., locks, fences, security guards, etc.), 2) Technical controls such as logical access, authentication, firewalls, and antivirus, etc., 3) Administrative or procedural controls such as information-security policies, incident response plans and procedures, etc., and 4) Compliance controls such as information security frameworks, standards, and privacy laws (e.g., COBIT, NIST Cyber Security Framework (CSF), ISO/IEC 27001/2, GDPR (Europe's new data privacy and security law), etc.).

Layered-Defense is a multi-faceted cybersecurity strategy whereby multiple layers of defense are implemented to thwart or impede the activities or attempts by cyber attackers to compromise a network or system. An example of a Layered-Defense strategy would include perimeter defense, network defense, host defense, application defense, data defense, and physical security. A typical approach of a Layered-Defense strategy would include the use of antivirus, firewall, parental control, privacy control, anti-spam, and secured computer under lock and key initiatives. However, the major disadvantage of the Layered-Defense strategy is that it primarily focuses on technical controls to protect or defend information-processing assets from cyber threats with little or no emphasis being placed on the physical, administrative, and compliance controls. Another major drawback to the Layered-Defense strategy is that its simplistic approach makes it inflexible, susceptible to being exploited, and inadequate at securing data- and information-processing assets from being compromised by cyber threats.

The other widely used strategy for mitigating cyber threats, Defense-in-Depth (DiD), is also a multi-faceted cybersecurity strategy that encompasses a series of layered defensive mechanisms aimed at thwarting cyber attacks. DiD however differentiates itself from the Layered-Defense approach by incorporating the use of multiple redundant information security defensive measures or controls that incorporate a broader and more variable approach to network security such as forensic recovery, intrusion detection and prevention, and alarm and notification systems. An example of a DiD strategy would include Layered-Defense, Security Information and Event Management (SIEM) system to facilitate monitoring/alerting/emergency response, disaster recovery, cybercriminal activity reporting, and forensics analysis.

While DiD focuses on many facets of information security controls, its established multi-dimensional controls require segregation of responsibilities; hence, stakeholders involved typically assume that security policies at levels above and below them are ideally being managed effectively, which might not be the case. Another major disadvantage to the DiD approach is that it is comprised of many elements, which can make it more complex, expensive, and difficult to implement and manage the three tenet of information security (i.e., confidentiality, integrity, and availability) than the Layered-Defense approach. This makes the DiD approach skewed and more difficult to implement and manage, whenever one of the aforementioned information security tenets is altered. Therefore, the complexity of the DiD strategy makes it extremely difficult to find or strike a balance between costs, performance, and operations.

One offensive counterattack strategy used to mitigate cyber attacks is outlined in "U.S. Pat. No. 9,215,208 B2". However, the offensive counterattack approach outlined herein is based on a conventional network architecture as opposed to the autonomous AI/ML-based network architecture constituted by the proposed Payne Offensive Cybersecurity Appliance (Payne OCA). Furthermore, the network attack offensive appliance outlined in "U.S. Pat. No. 9,215,208 B2" does not render a cyber attacker's hardware inoperable by destroying the electronic components associated with those hardware (i.e., the computer system used to instigate the cyber attack, discovered peripheral smart devices, and network-edge device such as a modem, router, and/or modem-router interconnected to the cyber attacker's LAN). Instead, it uses traffic flow termination and/or jamming, botnet capture and botnet threat control to turn a botnet into an attacker of the offending botnet controller, disinformation, and DNS request capture/DNS request rewrite to reroute traffic away from an identified botnet, in order to neutralize a cyber attack.

Hence, a need remains in the art for a cybersecurity appliance that is more effective, less complex, and have the ability to facilitate a balance between cost, performance, and operations.

SUMMARY OF THE INVENTION

The need in the art is addressed by the inventive cyber security appliance comprising a processor and software stored in a tangible medium for execution by the processor to provide: a cyber threat assessment module for assessing an incoming cyber threat to a second system and providing a profile of a cyber attacker associated with the threat; and a cyber spider engine operationally coupled to the cyber threat assessment module for generating at least one cyber spider for disabling one or more components of the cyber attacker's system.

In the illustrative embodiment, the appliance further includes a cyber attack module for providing a transport or communications channel to enable the cyber spider to attack the cyber attacker's system. In accordance with the present teachings, the profile is derived from a plethora of data-mining techniques. The system further includes a database layer operationally coupled to the cyber threat assessment module for storing data relating to the cyber threat and the cyber attacker.

Hence, the Payne OCA provides an offensive cyber security method including the steps of: providing a first system having a processor; commanding the processor to execute software effective to assess an incoming cyber threat to a second system from a cyber attacker; generating at least one cyber spider for disabling one or more components of the cyber attacker's system; and transporting the cyber spider to the attacker's system to enable the cyber spider to attack the cyber attacker's system.

DESCRIPTION OF THE INVENTION

Figure 1:
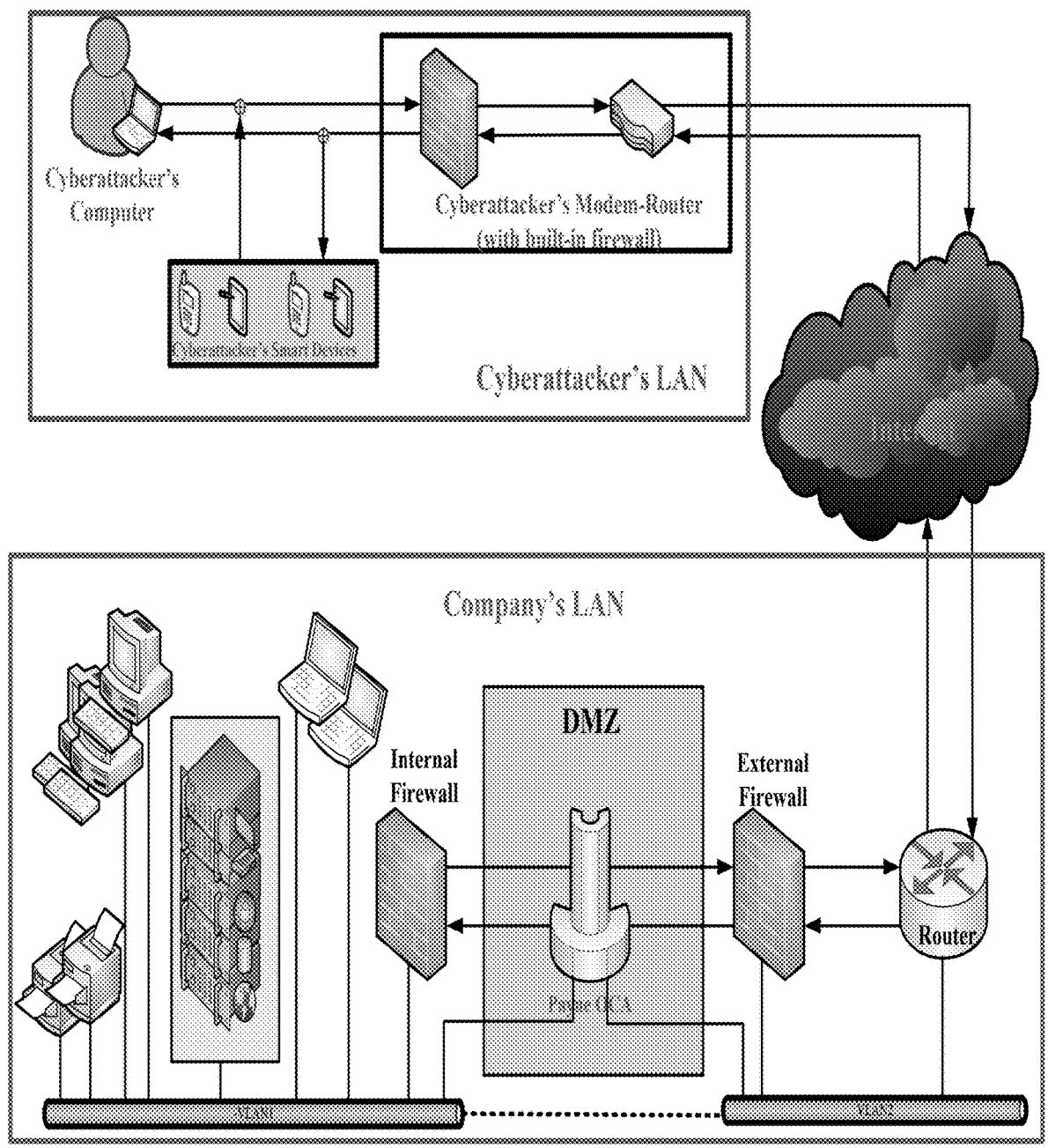
FIG. 1 is a diagram that depicts the OCA emplaced in the DMZ of a company's network infrastructure using at least two physical firewalls in accordance with the present teachings.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Today's information security controls and countermeasures that are designed to protect the confidentiality, integrity, and availability of data- and information-processing assets from cyber threats are fundamentally based on conventional defensive information-security frameworks. Furthermore, these defensive information-security frameworks are essentially grounded on either a Layered-Defense or Defense-in-Depth strategy. Fundamentally, Layered-Defense and Defense-in-Depth strategies are models that rely on multiple redundant defensive measures to shield or defend data- and information-processing assets from malware and other nefarious cyber threats posed by malicious-threat actors. Given the inability of today's information-security strategies to effectively mitigate the proliferation of real-time cyber threats such as RaaS directives and emergent killware, another method that may be used to deter cyber-criminals or malicious-threat actors from promoting cyber attacks or unauthorized intrusions to organizations' data and communications networks involves the adoption of an unconventional offensive information security stratagem.

The inventor has excogitated a novel OCA (also known as the Payne OCA) that is based on an offensive information security stratagem. Moreover, the proposed offensive information security stratagem is grounded on an autonomous Artificial-Intelligence (AI)/Machine-Learning (ML) information-security exemplar. The information-security exemplar in turn is built on an infrastructure layer, which is comprised of a framework composed of an innovative Commercial-of-the-Shelf (COTS), horizontal-scalable, High Performance Computing (HPC) cluster. Subsequently, the HPC cluster is composed of integrated AI/ML technology encapsulated within Transient Electromagnetic Pulse Emanation Standard (TEMPEST) rated material; that is, the OCA's underlying core internal-software and internal-hardware components are enveloped within TEMPEST-rated material.

Intrinsically, the OCA's underlying core internal-hardware components are primarily comprised of a fusion of integrated AI accelerator and Trusted Platform Module (TPM) technologies. Contrastingly, it's underlying core internal-software components are primarily comprised of an architectural blend of virtualized technologies. These virtualized technologies include the following: 1) An autonomous hybrid AI/ML-based Artificial Neural Network (ANN), 2) An integrated autonomous hybrid AI/ML-based Host Intrusion Detection System/Intrusion Prevention System (HIDS/HIPS), Security Information and Event Management system with an integrated IP-Traceback Module (SIEM-IPTM), and Dynamic Research Honeynet (DRH), 3)

A coalescent covert abstract or virtual transport-and-communications framework, and 4) An Object-Oriented Database Management System (ODBMS) that is based on the Real-Time Object-Oriented Database Architecture for Intelligent Networks (RODAIN) management system model.

Both the OCA's internal-hardware and internal-software components are administered by SELinux, which is a Mandatory Access Control (MAC) Operating System (OS) that is typically used by military organizations. Fundamentally, the OCA is designed to target and neutralize or obliterate identifiable networked devices interconnected to a cyber attacker's Local Area Network (LAN). In essence, the OCA is synonymous to an Electro Magnetic Pulse (EMP) appliance. However, instead of using hardware to generate amplified electromagnetic energy to render electronic devices' circuitries inoperable, the OCA contrarily uses an Advance Persistent Threat (APT) based CoC model to accomplished this task. Intrinsically, the proposed APT-based CoC model is designed to deliver custom-generated offensive destructive payloads via a virtual Internet-based communications framework.

In the illustrative embodiment, the present invention is an Offensive Cybersecurity Appliance or OCA that is based on an offensive, autonomous, Artificial Intelligence (AI)/Machine Learning (ML), information-security paradigm. In addition, the OCA's architectural design is grounded on a High Performance Computing (HPC) exemplar, which has the intrinsic ability to automatically target and neutralize identifiable or discovered networked devices. Moreover, its logistical core functions mimic the tactical operations of a military reconnaissance and strike-coordination mission. For example, the OCA is designed to conduct the following functions: a) It deploys InCDs to perform cyber threat assessment and network- and system-vulnerability reconnaissance and enumeration, b) It uses the collected data from its reconnaissance and enumeration mission to formulate a profile of the cyber attacker based on data and cognitive human behavioral analytics, and c) It subsequently creates a tactical covert action plan to target and neutralize or obliterate devices interconnected to the cyber attacker's Local Area Network (LAN). Essentially, the OCA successively uses the gathered data from the deployed InCDs to formulate a CWS and a subsequent APT-based CoC, which it then uses as a coalesced framework to facilitate its tactical covert action plan. This tactical covert action plan is comprised of a set of function used by the OCA to destroy networked devices interconnected to the cyber attacker's LAN.

Fundamentally, the OCA's primary objective is to deter or thwart cybercriminals' malicious activities by instituting an APT-based CoC that would make it cost ineffective for cybercriminals to instigate future cyber attacks (i.e., making malicious-cybercriminal activity a costly endeavor). This cost-ineffective directive is accomplished by obliterating discovered or identifiable electronic devices interconnected to cyber attackers' LANs. These electronic devices may comprised of the computer system used to promote the cyber attack; peripheral smart devices such as smart phones, smart TVs, Tablets, Internet-of-Thing (IoT) gadgets, etc.; and network-edge devices (i.e., modems, routers, and/or modem-routers) discovered by the OCA's deployed InCDs. For the deployed InCDs to effectively carry out a tactical covert target-and-neutralize operation, the OCA must first be positioned in the demilitarized zone or DMZ of a company's LAN infrastructure as illustrated in FIG. 1.

FIG. 1 is a diagram that illustrates the OCA's emplacement in the DMZ of a company's network infrastructure using at least two physical firewalls in accordance with the present teachings.

The OCA is fundamentally comprised of the following three layers: 1) The infrastructure layer, 2) The Artificial Intelligence layer, and 3) The database layer.

The infrastructure layer is the foundation for both the Artificial Intelligence and database layers (i.e., both the Artificial Intelligence layer and database layer are superimposed on the infrastructure layer). Moreover, the infrastructure layer is essentially comprised of a mélange of high-end COTS computer and network equipment configured in a redundant HPC cluster architecture.

The Artificial Intelligence layer's underlying core internal-software components are primarily comprised of an architectural blend of the following conceptualized elements: 1) Cyber Threat Assessment Module or CTAM, 2) Cyber Spider Engine or CSE, and 3) Cyber Attack Module or CAM.

Figure 2:
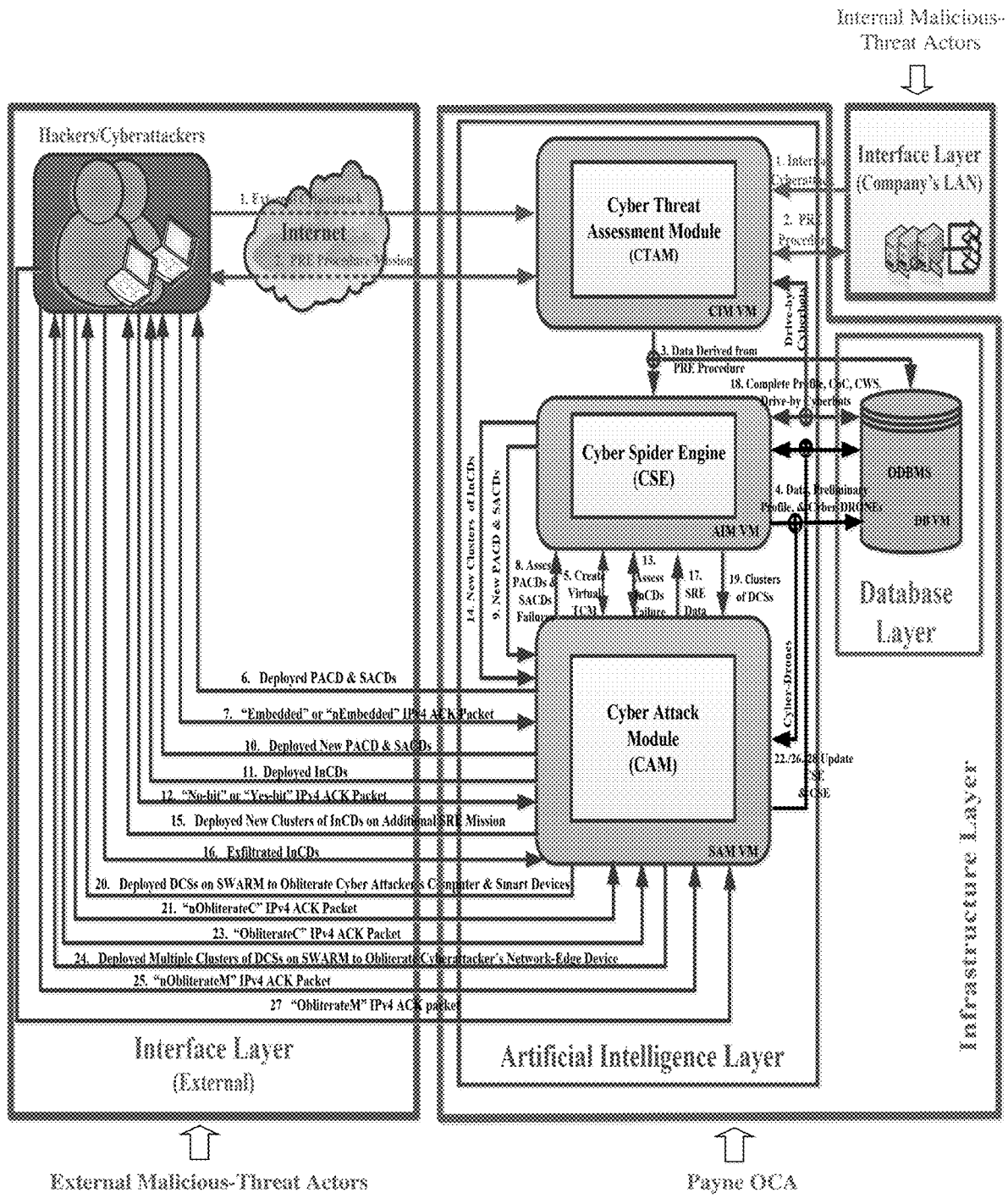
FIG. 2 is a diagram of the OCA's architecture that depicts data flows between its layers in accordance with the presented invention.
Figure 3:
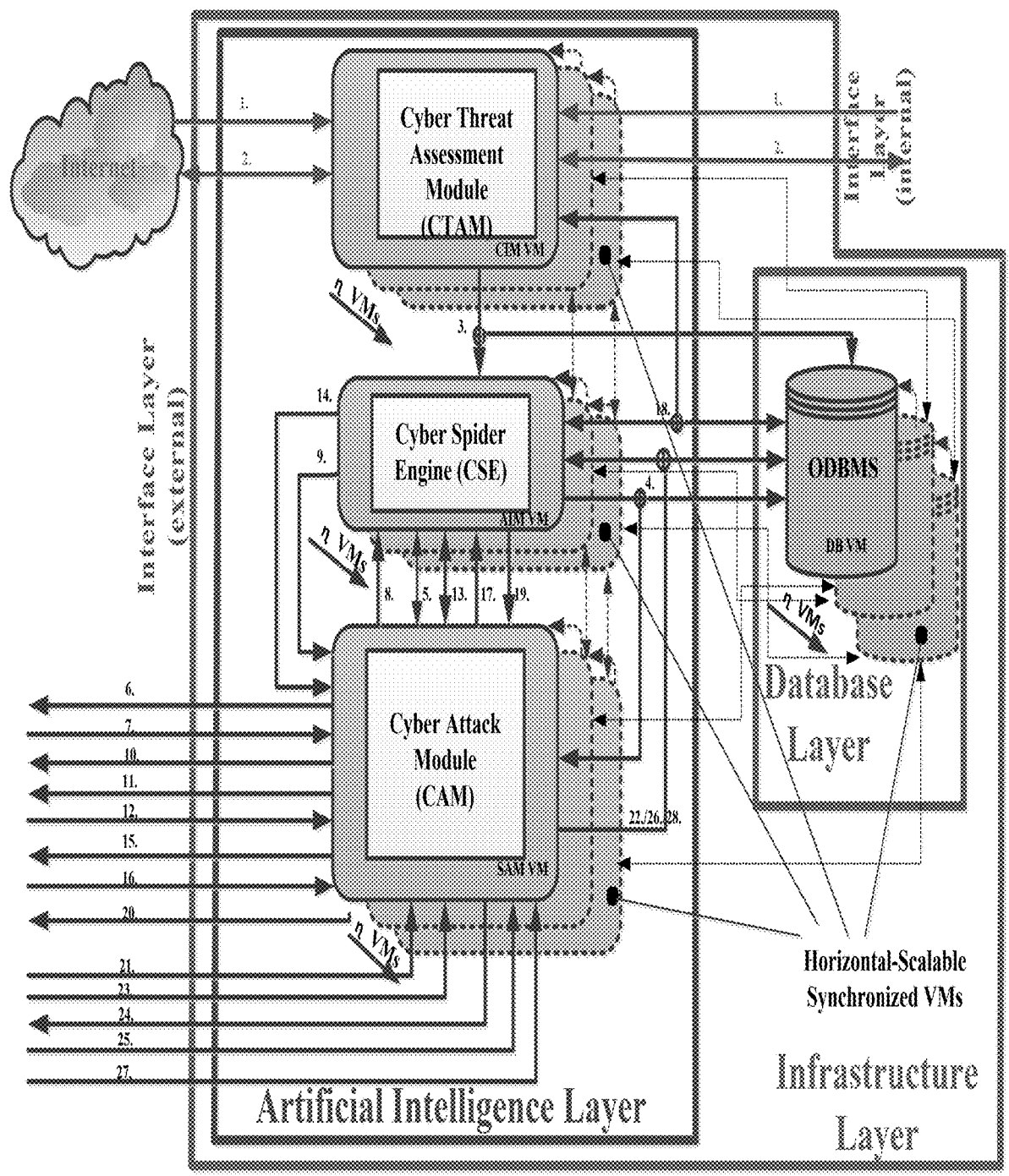
FIG. 3 is a diagram of the OCA's architecture that depicts the multiplicity of its layers and sub-layers in accordance with the presented invention.

Tightly interlaced with the CTAM, CSE, and CAM is the database layer. The database layer is comprised of an ODBMS that is based on the RODAIN management system model. Diagrams of the OCA, highlighting the topologic dataflow instituted by its AI layer's CTAM, CSE, CAM, and its database layer, are illustrated in FIGS. 2 and 3.

Oca Components

Cyber Threat Assessment Module (CTAM): A module based on customized software comprising of integrated autonomous AI/ML-based DRH, HIDS/HIPS, Drive-by cyberbots or Drive-by cyber spiders, and SIEM-IPTM. The CTAM's primary functions include continuously monitoring for and assessing external and internal cyber attacks (illustrated as data flow 1 in FIGS. 2 and 3) and conducting a Preliminary Reconnaissance and Enumeration (PRE) procedure aimed at illuminating the types of exploitable vulnerabilities associated with the hardware and firmware of the cyber attacker's system.

Cyber Spider Engine (CSE): A module based on integrated Artificial Intelligence, Machine Learning, and Deep Learning technologies that uses an amalgamated three-tier ANN to facilitate the formulation, synthersization, and generation of autonomous or autonomic synchronized AI/ML-based cyberbots or cyber spiders. These cyber bots or cyber spiders manifest as the following abstract or virtual synchronized cyber-entities: PACDs, SACDs, In, ImCDs, and Drive-by cyberbots. The CSE's primary function is to perform data-mining operations and analyze all data collected by the deployed and intrinsic cyberbots.

Cyber Attack Module (CAM): A module whose primary objective is to formulate and generate multiple, abstract, covert, Transport and Communication Channels (TCCs). Subsequently, these TCCs are facilitated using multiple system-penetration schemes that are successively aggregated to create a virtual Transport and Communications Medium (TCM). Essentially, the TCM is the communicative conduit used to facilitate the OCA's Secondary Reconnaissance and Enumeration (SRE) procedures and APT-based CoC missions; it is also used to promote continuous communications with all deployed and intrinsic AI/ML-based cyberbots or cyber spiders.

Object-oriented Database Management System (ODBMS): An interconnected, real-time, memory-based, database system that is based on the RODAIN management system model. Developed on the Java platform, the ODBMS is used for storing all systems generated objects, data, files, and logs.

Primary Authoritative Cyber Drones (PACDs): Explicitly designed cyberbots or cyber spiders that are created by the OCA's CSE. PACDs are specifically programmed to interpose their polymorphic-shellcode payloads (as described in the Artificial Intelligence Layer section) into the Random Access Memory (RAM), Non-volatile RAM (NVRAM), Non-volatile Basic Input Output System (NV-BIOS) memory, and the Operating System's (OS's) kernel of a cyber attacker's network-edge device, after being deployed by the OCA's CAM.

Secondary Authoritative Cyber Drones (SACDs): Explicitly designed cyberbots or cyber spiders that are created by the OCA's CSE. SACDs are specifically programmed to interpose their polymorphic-shellcode payloads into the RAM, NVRAM, NV-BIOS memory, and the OS's kernel of a cyber attacker's computer system used to instigate the cyber attack. They are also programmed to embed their polymorphic-shellcode payloads into specifically discovered microprocessors embedded within peripheral smart devices that are interconnected to the cyber attacker's LAN, upon being deployed by the OCA's CAM.

Infiltrative Cyber Drones (InCDs): Explicitly designed cyberbots or cyber spiders that are created by the OCA's CSE. They are deployed by the ImCDs (described below) to conduct secondary fact-finding missions. For example, InCDs are deployed by ImCDs on missions to conduct SRE. The purpose of these SRE missions is to collect additional cyber threat assessment and vulnerability reconnaissance and enumeration data of devices interconnected to the cyber attacker's LAN.

Imperatorial Cyber Drones (ImCDs): Explicitly designed cyberbots or cyber spiders that are created by the OCA's CSE. ImCDs reside in the OCA's CAM and are specifically programmed to work in unison to administer, monitor, and assess the health of all deployed synchronized AI/ML-based cyberbots (i.e., PACDs and SACDs), clusters of InCDs, and clusters of DCSs described below). The process of monitoring deployed cyberbots or cyber spiders is conducted via synchronous relayed links that are facilitated via the OCA's virtual TCM. For example, InCDs' and DCSs' communications and health checks are relayed via the SACDs, then to the PACD, and subsequently to the ImCDs specifically assigned to the PACD via the TCM's synchronous relayed links.

Destructive Cyber-Spiders (DCSs): Explicitly designed cyberbots or cyber spiders that are created by the OCA's CSE. They are deployed by the ImCDs to perform an offensive, tactical, covert, APT-based CoC used for obliterating hardware and firmware. Essentially, an APT-based CoC is a blueprint for a tactical attack action plan that is based on an APT model, whereby multiple AI/ML-based penetration- and subsequent firmware-based attacks are directed at rendering cyber attackers' hardware inoperable. This hardware includes the computer system used to instigate the cyber attack, discovered peripheral smart devices, and network-edge devices interconnected to cyber attackers' LANs.

The logistics of the OCA's topologic dataflow illustrated in FIGS. 2 and 3 are manifested as the dataflow diagrams depicted in FIGS. 8 through 12. Comprehensive descriptions of these dataflow diagrams are further detailed in the forthcoming Artificial Intelligence Layer section. A synopsis of the data flows is as follows:

1) The OCA continuously monitors for external and internal cyber attacks via its CTAM.
2) From the onset of detecting an external and/or internal cyber attack, the OCA's CTAM conducts its PRE procedure. However, if an internal cyber attack occurs, the OCA instructs the preinstalled Cyber Threat Intelligence (CTI) agent hosted on the particular company-owned host or device that was used to institute the cyber attack to sever or disunite that host's or device's connection from the company's network; the OCA also sends an alert notification to the company's IT department, Security Operating Center (SOC) or Network Operating Center (NOC) identifying the specifically compromised system and requesting that a computer-forensic audit of the distinctively identified host or device be conducted.
3) The data derived from the PRE procedure are forwarded to the CSE and ODBMS to be processed and stored respectively.
4) The CSE subsequently data-mines the PRE dataset and extrapolates data and cognitive human behavioral analytics. It successively uses these analytics to identify patterns and trends and then generates a) a preliminary profile of the cyber attacker and b) multiple specific AI/ML-based cyberbots (i.e., PACDs, SACDs, ImCDs, and multiple clusters of InCDs). The CSE subsequently forwards the PRE dataset, cyber attacker's preliminary profile, and all aforementioned system-generated cyberbots to the ODBMS. Additionally, the CSE forwards the system-generated cyberbots or cyber spiders to the CAM.
5) The CSE implores the CAM to create a unified abstract or virtual TCM, which is based on multiple penetration techniques.
6) Upon creating the virtual TCM, the CAM instructs the hosted ImCDs to deploy the PACD and multiple SACDs. The PACD and SACDs are programmed to embed or implant themselves into the RAM, NVRAM, NV-BIOS memory, and the OS kernels of networked devices. These networked devices may include the computer system used to instigate the cyber attack, discovered peripheral smart devices, and network-edge device interconnected to the cyber attacker's LAN.
7) The CAM confirms whether the deployed PACDs and SACDs were successful or unsuccessful in their implantation endeavor, expressed in process 6, via a specially received crafted "Embedded" or "nEmbedded" IPv4 Acknowledgement (ACK) packet.
8) If the outcome parameter in process 7 is deemed "unsuccessful", the CAM instructs the CSE to autonomously conduct an assessment to determine the root cause as to why the implanted endeavor failed.
9) Based on an "unsuccessful" outcome parameter from process 7, the CSE automatically revises its infiltrative SRE strategy, generates a new PACD and multiple SACDs capable of circumventing information security controls instituted by security-based components of the cyber attacker's LAN, and passes them to the CAM.
10) The ImCDs, being hosted by the CAM, deploy the newly generated PACD and multiple SACDs, expressed in process 9, via the established virtual TCM.
11) If the outcome parameter in process 7 is deemed "successful" the ImCDs deploy The multiple clusters of InCDs via the established virtual TCM on a SRE mission. The SRE mission includes having the deployed InCDs circumvent encountered Information security controls instituted by security-based components being hosted on the cyber attacker's LAN (e.g., firewall, HIDS/HIPS, authentication solutions, encryption, antivirus/anti-malware applications, etc.), prior to performing the SRE procedure.

12) The CAM confirms whether the clusters of InCDs were "successful" or "unsuccessful" in their endeavor to circumvent the information security controls expressed in process 11 via a specially crafted "No-bit" or "Yes-bit" IPv4 ACK packet.
13) If the outcome parameter in process 12 is deemed "unsuccessful", the ImCDs instructs the CSE to conduct an assessment to determine the root cause as to why the InCDs were unsuccessful on their mission to circumvent the cyber attacker's information security controls.
14) Based on an "unsuccessful" outcome parameter from process 12, the CSE autonomously revises its infiltrative SRE strategy and tactics, systematically develops a viable solution, fabricates new multiple clusters of synchronized InCDs, and passes them to the CAM.
15) The ImCDs being hosted by the CAM subsequently deploy the newly generated synchronized clusters of InCDs to circumvent the information security controls instituted by the cyber attacker's security-based components of the cyber attacker's LAN, in order to conduct an additional SRE mission.
16) If the outcome parameter in process 12 is deemed "successful", the clusters of InCDs autonomously conduct their SRE missions (i.e., perform additional cyber threat intelligence and network- and system-vulnerability reconnaissance and enumeration aimed at discovering latent vulnerabilities not previously discovered via the PRE procedure. If the SRE missions are unsuccessful, the clusters of InCDs use their inherent machine-, deep-, and self-learning algorithms to autonomously revise the CWS and CoC to facilitate a new SRE strategy and subsequently reattempt to conduct new SRE missions. However, if the SRE missions are successful, the clusters of InCDs are exfiltrated to the CAM with the collected data from the SRE missions. Similarly, If the exfiltrated process is unsuccessful, the clusters of InCDs autonomously use their inherent machine-, deep-, and self-learning algorithms to autonomously revise the CWS and CoC to facilitate a new exfiltration strategy and subsequently reattempt the process of conducting a new exfiltration.
17) The CAM forwards the amassed SRE dataset to the CSE for processing.
18) The CSE aggregates the PRE and SRE datasets, performs a plethora of data mining operations on the aggregated PRE-SRE dataset, and successively generates both data and cognitive human behavioral analytics. It successively uses these analytics to formulate a complete profile of the cyber attacker, a CWS that outlines the path towards achieving a successful formulated APT-based tactical covert action plan, and an APT-based CoC that outlines the actual APT-based tactical action plan laid out in the CWS, if queries to the ODBMS determine that a historical complete profile, CWS, and CoC are nonexistent.

The CSE also uses the derived data and cognitive human behavioral analytics to formulate, synthesize, and generate new AI/ML-based Drive-by cyberbots (i.e., it uses the algorithm associated with preprogrammed Drive-by cyberbots that are strategically embedded within Honeypots' and HoneyClients' documents as a template to model and create new Drive-by cyberbots). Additionally, the CSE saves the newly generated AI/ML-based Drive-by cyberbots to the ODBMS and concurrently forwards a copy of them to the CTAM.

19) If an external or Internet-based cyber attack occurs, the CSE spontaneously creates multiple clusters of synchronized DCSs on demand (based on the data and cognitive human behavioral analytics, cyber attacker's complete profile, CWS, and CoC formulated in process 18) and forwards them to the CAM. The clusters of synchronized DCSs are tagged by their correspondingly assigned ImCDs and later deployed via the established virtual TCM on a target-and-neutralize mission to obliterate the networked devices, expressed in process 6, which are interconnected to the cyber attacker's LAN.
20) Based on the CWS and CoC, the ImCDs deploy the multiple clusters of synchronized DCSs on a Seige Wallop Annihilate Ravage Mission (SWARM). The OCA uses the SWARM to render the computer system used by the cyber attacker to instigate the cyber attack and discovered peripheral smart devices interconnected to the cyber attacker's LAN inoperable, by destroying the electronics associated with the aforementioned hardware.
21) The synchronized ImCDs assess whether the SWARM was carried out successfully or Unsuccessfully on its quest to destroy the cyber attacker's computer system used to instigate the cyber attack and discovered peripheral smart devices interconnected to the cyber attacker's LAN. It does this by monitoring the relative success rate of the deployed clusters of synchronized DCSs on their target-and-neutralize mission. This success rate is determined based on the parameters ascertained from respective associated ACK packets and heartbeat/keep-alive pulses or signals received from the deployed clusters of DCSs.

If the SWARM was unsuccessful at destroying or obliterating the cyber attacker's computer system used to instigate the cyber attack and discovered smart devices interconnected to the cyber attacker's LAN, the PACD sends a specially crafted "nObliteratedC" IPV4 ACK packet to its assigned ImCDs residing in the CAM. The CAM in turn updates the CSE and ODBMS accordingly. Additionally, the DCSs deployed on the SWARM autonomously use their inherent machine-, deep-, and self-learning algorithms to revise the CWS and CoC and subsequently reattempt to destroy the cyber attacker's computer system used to instigate the cyber attack and discovered smart devices interconnected to the cyber attacker's LAN.

22) If the SWARM was successful at destroying or obliterating the cyber attacker's computer system used to instigate the cyber attack and discovered smart devices interconnected to the cyber attacker's LAN, the PACD sends a specially crafted "ObliterateC" IPv4 ACK packet to its associated ImCDs residing in the CAM. The ImCDs subsequently deploy multiple clusters of DCSs on another SWARM to destroy or obliterate the cyber attacker's network-edge device (e.g., modem-router).
23) Similarly to process 21, the synchronized ImCDs assess whether the SWARM was carried out successfully or unsuccessfully on its quest to destroy the cyber attacker's network-edge device. If the SWARM was unsuccessful at destroying or obliterating the cyber attacker's network-edge device, the PACD sends a specially crafted "nObliteratedM" IPV4 ACK packet to its associated ImCDs residing in the CAM. The CAM in turn updates the CSE and ODBMS accordingly.

Additionally, the DCSs deployed on the SWARM use their inherent machine-, deep-, and self-learning algorithms to autonomously revise the CWS and CoC and subsequently reattempt to destroy the cyber attacker's network-edge device.

24) If the SWARM was successful at destroying or obliterating the cyber attacker's network-edge device, the PACD sends a specially crafted "ObliterateM" IPv4 ACK packet to its associated ImCDs residing in the CAM. The CAM in turn updates the CSE and ODBMS accordingly.

25) Upon destruction of the cyber attacker's network-edge device, any cyberbots remaining on the cyber attacker's LAN and targeted hardware devices autonomously expunge their digital footprints, traces, and dust. Thereafter, these cyberbots self-destruct or disintegrate leaving no traces of their existence.

Figure 4:
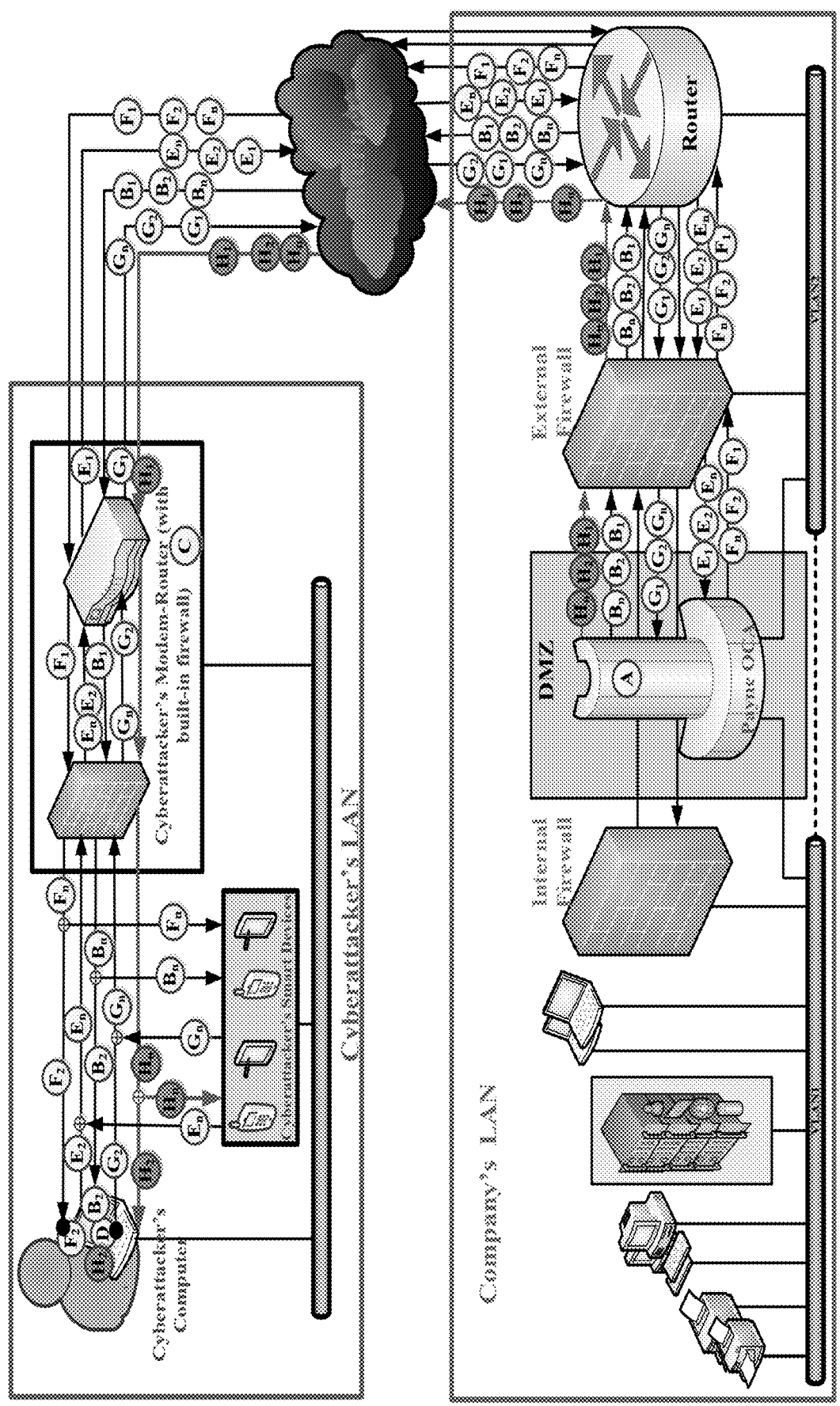
FIG. 4 is an architectural diagram that illustrates synoptic, abstract, chronological, logistical tasks carried out by the OCA in accordance with the present invention.

Whereas FIGS. 2 and 3 depict the topologic dataflow of the OCA, FIG. 4 represents an abstract architectural overview of its logistical functionality. The logistical functionality depicted in FIG. 4 is based on chronological events that are described as follows:

A. The OCA's CTAM intrinsically, continuously, and simultaneously monitors for cyber attacks from internal and external malicious-threat actors. It successively initiates its PRE procedure at the onset of a cyber attack, and uses the data derived from its PRE procedure to formulate, synthesize, and generate synchronized PACDs, SACDs, ImCDs, and InCDs.

B. The OCA's CAM instructs the ImCDs to deploy a PACD and multiple synchronized SACDs.
   $B_1$—Primary ACD.
   $B_2$ through $B_n$—SACDs, whereby $B_n$ represents the number of SACDs that correlates to the number of smart devices that the OCA discovers on the cyber attacker's LAN.

C. The PACD ($B_1$) is embedded into the RAM, NVRAM, and NV-BIOS memory of the cyber attacker's network-edge device.

D. The SACDs ($B_2$ through $B_n$) are embedded into the RAM, NVRAM, NV-BIOS memory, and OS kernel of the computer system used to instigate the cyber attack and discovered peripheral smart devices interconnected to the cyber attacker's LAN respectively.

E. The PACD and SACDs, mentioned in C and D above, initiate synchronous low-frequency heartbeat and keepalive signals with their specifically assigned ImCDs.
   $E_1$—Synchronous low-frequency heartbeat and keepalive signals sent from cyber attacker's network-edge device.
   $E_2$ through $E_n$—Synchronous low-frequency heartbeat and keep-alive signals sent from the computer system used to instigate the cyber attack and discovered peripheral smart devices interconnected to the cyber attacker's LAN respectively.

F. The ImCDs deploy clusters of synchronized InCDs on a SRE mission.
   $F_1$—Cluster of synchronized InCDs directed at cyber attacker's network-edge device.
   $F_2$ through $F_n$—Clusters of synchronized InCDs directed at cyber attacker's computer system used to instigate the cyber attack and discovered peripheral smart devices interconnected to the cyber attacker's LAN respectively.

G. Upon executing and concluding with their SRE procedure/mission, the clusters of InCDs are collectively exfiltrated from the cyber attacker's network-edge device, computer system used to instigate the cyber attack, and discovered peripheral smart devices with their respective SRE data to the OCA's CAM. In addition, the SRE data is subsequently relayed to the CSE to be processed.
   $G_1$—Cluster of synchronized InCDs exfiltrated from cyber attacker's network-edge device.
   $G_2$ through $G_n$—Clusters of synchronized InCDs exfiltrated from cyber attacker's computer system used to instigate the cyber attack and discovered peripheral smart devices interconnected to the cyber attacker's LAN respectively.

H. After the OCA's CSE aggregates the PRE and SRE data attained in processes A and B above, it successively performs a plethora of data-mining operations to ultimately extrapolate data and cognitive human behavioral analytics. These analytics are subsequently used to create a CWS and APT-based CoC, which in turn are used to formulate, synthesize, and generate multiple clusters of synchronized DCSs. The CSE subsequently solicits the ImCDs, being hosted by the OCA's CAM, to deploy the formulated clusters of synchronized DCSs via the already established virtual TCM. The deployed clusters of synchronized DCSs are tasked with the mission to target and neutralize or obliterate the computer system used to instigate the cyber attack, discovered peripheral smart devices, and network-edge device interconnected to the cyber attacker's LAN.
   $H_1$—Cluster of synchronized DCSs directed at cyber attacker's network-edge device.
   $H_2$ through $H_n$—Cluster of synchronized DCSs directed at neutralizing the cyber attacker's computer system used to instigate the cyber attack and discovered peripheral smart devices interconnected to the cyber attacker's LAN respectively.

The internal logistical operation of the OCA is based on an elastic architectural model. That is, the OCA is designed to automatically scale or expand its resources exponentially, as cyber attack loads increase; contrastingly, it is also designed to automatically contract its resources, as cyber attack loads decrease. The OCA's innate ability to autonomously expand and contract its resources on demand allows it to allocate and deallocate the necessary Virtual Machines (VMs) required to dynamically and efficiently process detectible cyber attacks. VMs are later discussed in the Operating System and Database Layer sections.

1) Infrastructure Layer

Hardware

Figure 5:
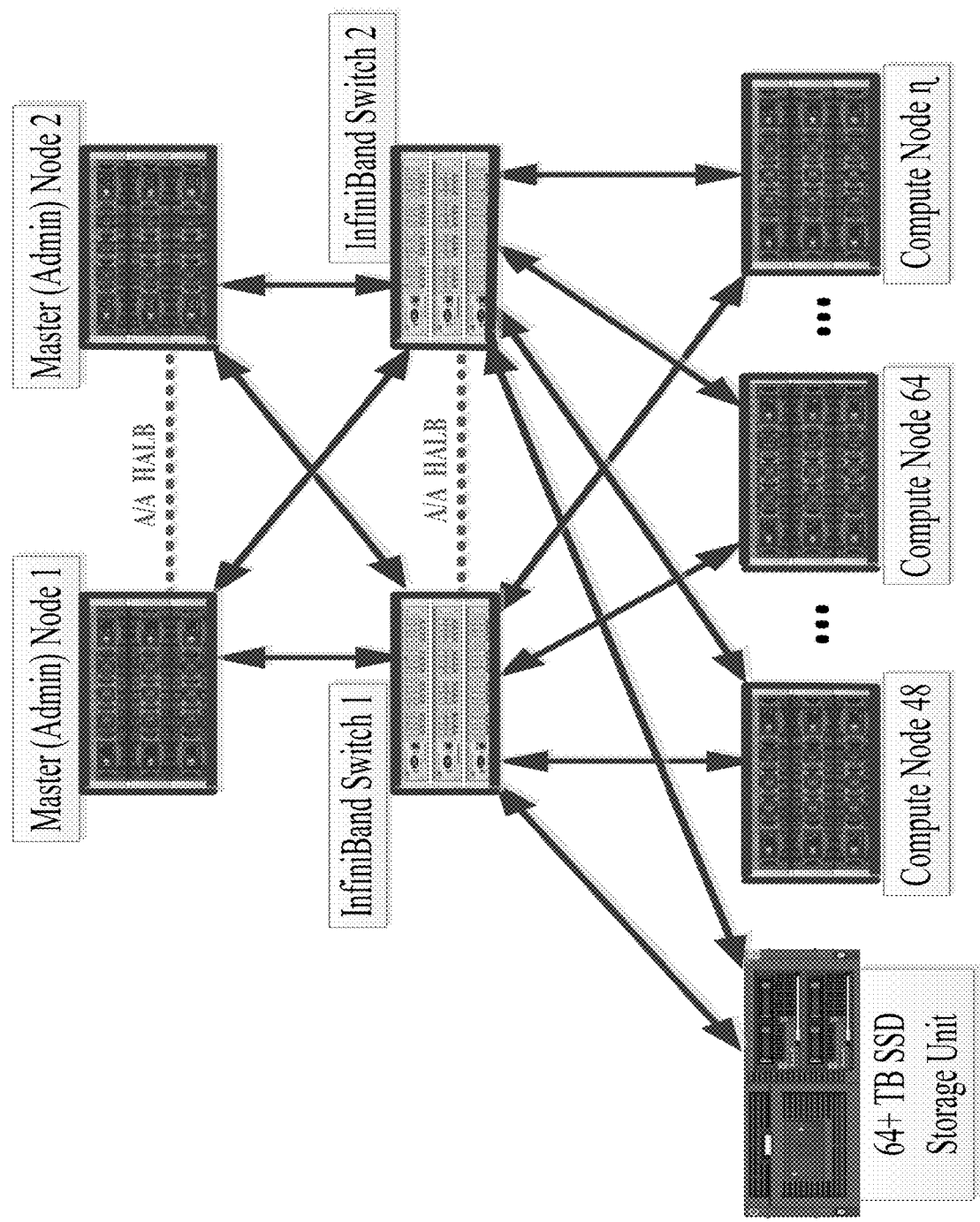
FIG. 5 is a topologic diagram of the HPC cluster of the present invention that abstractly represents the Infrastructure Layer. It highlights the architectural framework for the proposed HPC cluster and illustrates its Active/Active (AA) High-Availability Load Balancing (HALB) design in accordance with the prior art or the presented invention.

The OCA's infrastructure layer is comprised of an AI/ML-based, horizontal-scalable HPC cluster, which is encased in TEMPEST rated material. The OCA uses this TEMPEST rated material to suppress electromagnetic-signal emanations and coincidently mitigate against data-leakage-based and electromagnetic-emanation-based cyber attacks (e.g., side-channel attacks). FIG. 5 illustrates an abstract diagram of the proposed HPC cluster, which represents the Infrastructure Layer. At its core, the infrastructure layer is based on virtualization technology, which is the foundation for all other layers and their respective sub-layers. Furthermore, the infrastructure layer is comprised of high-end quintessential COTS servers and network-interconnected hardware equipment. The inventor chose to use a horizontal-scalable HPC cluster for the OCA's architectural-hardware framework, because of the predicted high-associated CPU- and GPU-workload requirements. For example, significant CPU and GPU processing power are required to effectively precipitate the autonomous and intrinsic formulation, synthesization, generation, and management of the following OCA's objects: a) immense quantity of custom-designed AI/ML-based cyberbots, b) those cyberbots' specialized payloads (which are later discussed in the Artificial Intelligent Layer section), c) custom-developed management software apps require to administer the OCA, and d) requirements of resources associated with the OCA's components (e.g., containers, sandboxes, and VMs used to construct and institute the OCA's CTAM, CSE, CAM, and ODBMS).

The OCA's proposed AI/ML-based, horizontal-scalable HPC cluster is designed to incorporate the use of integrated AI accelerator and Trusted Platform Module (TPM) microprocessors. AI accelerator technology is defined as essential microprocessor-hardware technology that is used to accelerate the processing of OS parameters. Conversely, TPM is considered a technology that incorporates the use of microchips on motherboards to promote hardware-based security-related functions such as secure storage and processing of symmetric and asymmetric keys, hashes, and digital certificates. Essentially, TPM is generally used to carry out cryptographic operations such as enfettering a hard drive by encrypting its content and storing the decryption key in the TPM chip or to constrain a system's state to a particular hardware and software configuration thereby deterring attempts to alter that particular system's configuration by making it tamper resistant. Both AI accelerator and TPM microprocessors are considered essential hardware components in the fabrication process of the proposed OCA's AI/ML-based, horizontal-scalable HPC cluster. Whereas the AI accelerator (in conjunction with the proposed HPC cluster's relatively vast number of GPUs) is designed to promote a high-processing capacity for all proposed custom-developed AI/ML-based objects and applications, the TPM microprocessors is designed to promote an effective fortified system-security (including whole drive data encryption) directive.

The architectural design for the proposed HPC cluster is also based on a network plug and play model. That is, a configuration template will automatically be pushed to newly discovered devices (i.e., nodes, switches, and SSD storage units) that are added to the HPC cluster. This means that an administrator will never have to manually configure the HPC cluster's hardware components, once the OCA is placed into production. An example of the hardware components comprehensively used in the fabrication of the proposed OCA's HPC cluster includes the following:

Master and Compute Nodes

Master/admin and compute nodes or servers comprising of AMD, Intel, IBM or Oracle-based scalable servers with a minimum of 48 compute nodes. The master/admin nodes are structured in an Active/Active (A/A) High Availability Load Balancing (HALB) configuration. Each of the HPC cluster's master/admin and compute nodes is based on current high-end, best-practice, quintessential, COTS hardware with integrated AI accelerator and TPM microprocessors. For example, all nodes may be built using the Cisco UCS B480 M5 Blade Servers with an applicable chassis, a HPE Apollo 6500 Gen 10 Plus server system with applicable Blade Servers configured in a rack formation, an IBM PowerPC System server with applicable chassis, or an Oracle SPARC Server System with applicable chassis. Examples of specifications for each node may include the following:

Four 3rd Gen AMD EPYC™ 7883X scalable Central Processing Units (CPUs) with each CPU ascendable up to 64 cores @3.GHz per CPU with 768 MB L3 cache (e.g., custom-built HPE Apollo 6500 Gen 10 Plus server) or four $2^{nd}$ Gen Intel® Xeon® Scalable CPUs with each CPU ascendable up to 54 cores @2.60 GHz per CPU (e.g., the Xeon Platinum 9282 included in the Cisco UCS B480 M5 server). Alternatively, an IBM PowerPC system with four Power10 CPUs (e.g., 4 GHz CPUs with 60/30 cores/socket or 15 SMT 8 cores with 8 threads/core or 240 HW threads, 8 crypto-accelerator algorithms that support common ciphers such as AES, 3DES, RSA, & SHA, & memory clustering) or an Oracle SPARC M8 Server with four CPUs (e.g., 5 GHz CPUs with 32 cores that support 256 HW threads, 65 MB L3 cache, 32 on-chip Data Analytics Accelerator, Silicon Secured Memory, & Cryptographic Instruction Accelerators) could be used in lieu of the recommended aforementioned AMD- or Intel-based servers.

Four Graphical Processing Units (GPUs) established to work in tandem with the AI accelerator to promote high-efficiency processing and management of system-generated AI/ML-based cyberbots (e.g., the Nvidia A100 80 GB GPU).

Integrated AI accelerator—Deep Learning Processor (DLP) such as a Neural Processing Unit (NPU) and Tensor Processing Unit (TPU)—and TPM microprocessors.

TPM 2.0 microprocessor module.

Industry-standard DIMM slots for 192×288-pin DDR4 memory or Intel® Optane™ DC persistent memory that support up to 24 TB of total memory at 3200 MHz speeds.

Two 200-Gbps Inifinband or FCoE (Fibre Chanel over Ethernet) network adapters or Network Interface Cards (NICs) used to give each compute-node server the ability to connect to different networks. These dual NICs are used to promote redundancy, while simultaneously working at different security levels. For example, the Mellanox InfiniBand ConnectX®-6 Single/Dual-Port network adapters that supports 200 Gb/s with Virtual Protocol Interconnect® (VPI) and two ports of 200 Gb/s InfiniBand and Ethernet connectivity.

Optional Modular LAN on Motherboard (mLOM) card with Cisco UCS Virtual Interface Card (VIC) 1455, a 5-port, 40-gigabit Ethernet (GbE), and FCoE aggregated at 200 GbE.

Optional rear Mezzanine VIC with five 40-Gbps unified I/O ports or five sets of 4×10-Gbps aggregated/unified I/O ports, delivering 200 Gbps to the server nodes (adapts to either 10- or 40-Gbps fabric connections).

Multiple 2.5-inch, hot-pluggable Hard Disk Drives (HDDs), Solid-State Drives (SSDs), or Nonvolatile Memory Express (NVMe) with a choice of enterprise-class Redundant Array of Independent Disks (RAID) or pass-through controllers.

Support for Optional SD Card or M.2 SATA drives for flexible boot and local storage capabilities per master/admin and compute node.

RS232/HDMI/VGA/USB-C ports may also be required for monitor and terminal connections.

Storage Unit

The OCA's HPC storage unit is comprised of a current, high-end, best-practice, quintessential-COTS, all-flash custom-built, smart-array storage node. For example, the HPC storage unit may be fabricated using the IBM's SAN Volume Controller (SVC) with a minimum of twelve 2.5 inch SATA 12 Gb/s 8 TB SSD HDs (i.e., a minimum of 96 TB all-flash storage solution).

Switches

Instead of Ethernet switches, all proposed nodes are interconnected via two quintessential COTS 200 Gbps InfiniBand or FCoE Switches as illustrated in FIG. 5. Similar to the two master/admin nodes, the two 200 Gigabit InfiniBand or FCoE switches are structured in an A/A HALB configuration designed to facilitate high availability and redundancy. For example, as a starter, the proposed InfiniBand switches may be comprised of the Mellanox QM8700 40 port InfiniBand switches with applicable VPI and redundant power supplies. However, due to the Mellanox QM8700 40-port constraint, the inventor recommends using the NVIDIA CS8500 InfiniBand switch from the onset, which is scalable up to 800×200 Gbs InfiniBand ports (up to 20 leafs; 40-ports/leaf).

Other

As part of the hardware infrastructure requirement, it is critical that redundant power supplies and an online double conversion Uninterrupted Power Supply (UPS) system be integrated into the structural design of the OCA's HPC. For this, the inventor has designed the OCA's HPC with an integrated online double conversion UPS, in order to promote continuous power in a fail-safe/overload protection mode. Additionally, organization integrating the proposed OCA into their network infrastructures should have standby back-up power generators in place, in order to inaugurate a continuous uninterrupted power supply to the OCA.

The OCA is designed to be a modularized scalable appliance that can be configured to scale simply by increasing the number of Master Nodes, Compute Nodes, and InfiniBand-Switch modules, which is automatically established by virtue of its plug-and-play architecture.

Operating System (OS)

All hardware (particularly the server nodes and ODBMS) of the proposed HPC are administered via a Gold Master (i.e., a hardened/stripped-down version) MAC version of the SELinux OS. The inventor selected a MAC-based OS for the OCA, because of its inherent multilevel security (MLS) policies. These policies outlined how data at different classification levels are to be protected and accessed simultaneously. Because of its multilevel security characteristic, MAC-based systems are typically used by U.S. Military and government agencies. Furthermore, the Kernel-based Virtual Machine (KVM) loadable module that is native to the SELinux Kernel as a hypervisor makes it an ideal tool to facilitate intrinsic containers, sandboxes, and VMs without the need for a third-party or middleware-based virtualization software. In addition, the SELinux's KVM loadable module are designed to use security extensions based on the modified Quick EMUlator (QEMU), which is a machine emulator and virtualizer that can be used to support hardware I/O emulation in addition to VMs.

Software

Each Master and Compute Node is configured with the following:

Cluster Management Tool—Software for managing HPC clusters (e.g., Warewulf, xCAT, ROCKS, Oscar, oneSIS, etc.)

FCoE—A standard protocol that allows Fibre Channel frames to be carried over Ethernet links. FCoE eliminates the need to install and configure separate LAN and SAN networks.

Local Area Multicomputer/Message Passing Interface (LAM/MPI)—A two tiered modular framework that ensures availability of coordinates of programs running as multiple instances in a distributed memory environment. LAM/MPI is used to establish message communications between the masters and compute nodes and is typically comprised of FORTRAN or C/C++ library of subroutines.

Network File System (NFS)—A distributed file system protocol that allows remote hosts to mount file systems over a network and interact with those file systems as though they are mounted locally.

Network Time Protocol (NTP)—A protocols used for synchronizing timekeeping among a set of distributed Internet time servers and clients.

Secure Shell Protocol (SSH)—A client/server security protocol that provides encryption and is used for logging into a remote server. In this case, SSH is used for inter-MPI-process communications.

SELinux—Security Enhanced Linux (MAC-based OS based on Linux Kernel).

Virtual Protocol Interconnection (VPI)—VPI devices that allow for the use of standardized networking, clustering, storage, and management protocols to seamlessly operate over any converged network using the same software infrastructure.

Other software is comprised of close-source, custom-developed master-node, client-side, and server-side AI/ML-based applications. Examples of such applications include the following virtualized AI/ML-based elements: a) Cyber threat-intelligence and forensics-gathering tools (i.e., the aforementioned intrinsic autonomous dynamic research Honeynets, Drive-by Cyberbots, Remote Access Trojans (RATs) and Control and Command (C2) Malware, which are later discussed in the Artificial Intelligent Layer section), b) Hybrid ANN, c) Autonomous hybrid HIDS/HIPS/SIEM-IPTM, d) CTI agents (i.e., custom-developed host-based agents AI/ML-based designed for monitoring, reporting, and appropriately responding to detected cyber threats autonomously), e) All cyberbots, and f) Virus/malware-detection and anti-virus/anti-malware applications.

All close-source, custom-developed, AI/ML-based applications are designed and programmed to be intrinsically autonomous and are developed using the following programing languages: Java, C/C++, Assembly, and Very High-Speed Integrated Circuits Program (VHSIC) Hardware Description Language or VHDL. In addition, custom-developed applications are designed and programmed to be sandboxed or executed in their own system assigned containers or VMs. Software requirements for the development, operations, and management of the proposed database are outlined in the Database Layer section.

Networking

For Ethernet networks, the inventor has chosen to use conservative maximum values for version 4 (IPv4) of the User Datagram Protocol (UDP) and Transmission Control Protocol (TCP) packets' encrypted payloads; namely, 400-byte and 1,000-byte maximum payloads for UDP and TCP packets respectively. For example, if you applied the proposed conservative maximum IPv4 UDP packet of 400 bytes, then all IPv4 UDP packets with payloads equal to or larger than 508 bytes (the typical maximum IPv4 UDP packet payload allotted) would have to be fragmented prior to being transmitted. Similarly, all IPv4 TCP packets with payloads equal to or larger than 1452 bytes (the typical maximum IPv4 TCP packet payload or Maximum Transfer Unit (MTU) allotted; although a maximum MTU of 1500 bytes is typically cited for Ethernet) would also have to be fragmented prior to being transmitted.

Packet fragmentation is an aspect of the Internet Protocol (IP) used to promote the transport of packets across networks with different MTU settings. Because different networks might be configured with different MTU settings, packets entering those networks with MTUs that are smaller than the packets' packet lengths would have to be fragmented prior to being transmitted. That is, each packet's payload would be divided into parts or fragments, with each fragment containing a fraction of the payload with its own header.

Essentially, using the proposed 400- and 1,000-byte encrypted-payload scheme for UDP and TCP packets would promote a higher probability that those packets are delivered to their appropriate destinations (without the need for fragmentation), instead of being dropped or discarded by encountered content-aware devices (e.g., packet-filtering firewalls, IDS/IPS, etc.).

By using such conservative measures for IPv4 UDP and TCP payloads, the inventor has taken into account other potential overhead that might occur throughout the packet-encapsulation process. For example, IPv4 TCP and UDP packet overhead are generally 64 bytes and 52 bytes respectively.

Therefore, the maximum allotted packet sizes the OCA uses for its IPv4 TCP and UDP packets equate to 1,064 bytes (payload of 1,000 bytes+overhead of 64 bytes) and 452 bytes (payload of 400 bytes+overhead of 52 bytes) distinctively, which do not exceed the maximum allotted TCP and UDP packet sizes of 1452 bytes and 508 bytes respectively.

Because intermediate system nodes or devices cannot fragment IPv6 packets, the inventor has also chosen to use conservative maximum values for IPv6 TCP and UDP packets' payloads; namely, a 1,000-byte maximum encrypted payload for both IPv6 UDP and TCP packets respectively. Additionally, 6 to 4 Tunneling may be instituted to facilitate the transporting of IPv6 traffic to IPv6-enabled devices.

In the case whereby an organization's network infrastructure is not based on Ethernet technology (e.g., fibre channel), then the aforementioned 400- and 1,000-byte encrypted-payload scheme would still be warranted. For example, even though a fibre channel frame uses a maximum payload of 2,048 bytes and a maximum allotted packet size of 2,148 bytes, the inventor chose to use the same maximum magnitudes of 1,064 and 452 bytes for TCP and UDP packet sizes respectively. This is because there is a high probability that most of the encountered networks and their respective network-based devices may be utilizing Ethernet technology.

The inventor recommends that organizations interesting in utilizing the OCA be connected to the Internet via an enterprise-based scalable router. This recommended router should support 200 Gb Ethernet and be scalable to 200 Gbps throughput. That is, the recommended router should have Ethernet ports that can be aggregated to 200 Gb with an acceptable and adequate WAN Interface Card (WIC) that is scalable to a relative throughput of 200 Gbps (e.g., a Cisco ASR 9000 series of router with an OC-3840 WIC).

Uniquely Identifying the Company's and Cyber attackers' Networked Devices:

A sample of the Stream Control Transmission Protocol (SCTP) and Transmission Control Protocol/Internet Protocol (TCP/IP) data collected during the OCA's passive fingerprinting phase (promoted by the CTAM) may include the following data-packet structure:

Initial packet size (16 bits)
Initial TTL (8 bits)
Window size (16 bits)
Maximum segment size (16 bits)
Window scaling value (8 bits)
Don't fragment flag (1 bit)
Selective acknowledgement (SACK) OK flag (1 bit)
nop flag (1 bit)

These collected SCTP- and TCP/IP-header values are successively aggregated to form a unique 67-bit number for each device (i.e., devices interconnected to the company's internal LAN/WAN and the cyber attacker's LAN). This 67-bit number is subsequently used as an inputted prerequisite to a Merkle hash tree based device-fingerprinting hash, which is used to process and output a unique digital fingerprint for each device. The OCA in turn would use these digital fingerprints to uniquely identify and catalogue devices connected to the company's LAN/WAN and the cyber attacker's LAN. Moreover, custom-developed preinstalled CTI agents on company-wide hardware devices (i.e., network devices, servers, and computer systems) would allow the OCA to distinctively differentiate between company- and non-company-owned devices (a procedure made possible by virtue of those devices' uniquely generated digital fingerprint).

2) Artificial Intelligence Layer

Cyber threat assessment Module or CTAM:

Programmed to operate in a designated virtualized environment consisting of multiple, horizontal-scalable, synchronized VMs, the CTAM is based on a hybrid client-server and master-node architecture. Whereas, the client-server architecture facet facilitates the acceptance of request from and the delivery of data packets to the client, the master-node architecture facet promotes the execution of parallel computations at the master while the node handles the storing and processing of data packets.

The CTAM's primary function is to identify real-time cyber attacks. It does this by continuously monitoring for both external and internal cyber attacks (illustrated as data flows1 in FIGS. 2 and 3) and conducting active and passive fingerprinting to identify such attacks. The CTAM is also tasked with identifying command-and-control traffic, scanning the digital landscape for data exfiltration efforts, and performing a Preliminary Reconnaissance and Enumeration (PRE) procedure or mission. It essentially uses the PRE procedure or mission to illuminate or discover different types of exploitable vulnerabilities associated with the networked devices (including firmware) being utilized by the cyber attacker (illustrated as data flow 2 in FIGS. 2 and 3).

The PRE procedure or mission involves conducting an autonomous cracking-the-perimeter episode, which is based on the use of cyber threat assessment and network- and system-vulnerability reconnaissance and enumeration schemes. The cracking-the-perimeter episode entails using multiple system- and network-penetration techniques to covertly circumvent the information security controls instigated by devices that are interconnected to cyber attackers' LANs (the perimeter being the demarcation or border between networks). If the CTAM has determined that a cyber attack was unsuccessful or ineffective after conducting its cracking-the-perimeter episode, it would further entice the cyber attacker by autonomously and dynamically spawning additional Honeynets and/or Honeypots and opening/enabling additional well-known exploitable ports and services. An example of the PRE procedure is as follows:

The $1^{st}$ phase of the cracking-the-perimeter episode involves conducting covert or passive reconnaissance and enumeration using effective and efficient "Intra- and Inter-Autonomous-System IP-Traceback" schemes. These schemes are used to forensically conduct a trace back to the cyber attacker's network-edge device and computer system used to instigate the cyber attack. Essentially, an Autonomous System or AS is considered a collection of connected Internet Protocol (IP) based routers under the control of one or more Internet Service Providers (ISPs). Whereas the Intra-AS IP-Traceback scheme involves IP tracebacks to hosts instigating internal cyber attacks, the Inter-AS IP-Traceback scheme involves IP tracebacks to hosts facilitating external or Internet-based cyber attacks.

According to Vipul (2019) and Murugesan, Shalinie, and Neethimani (2014), the hybrid IP-Traceback scheme provided the most effective method capable of performing an accurate IP trace back to the legitimate source node or host. In addition, Aghaei-Foroushani and Zincir-Heywood (2013) concluded that the packet marking approach used by the Deterministic Flow Marking Traceback (DFMT) scheme, which supported fragmented IP traffic, was able to correctly trace the origin of a cyber attacker's computer system. The DFMT scheme was shown to successfully perform trackbacks to a computer system, even if that computer system was concealed behind proxy routers, proxy firewalls, VPNs, or a combination of these aforementioned security controls (Foroushani and Zincir-Heywood, 2013).

Furthermore, Mittal, Pilli, and Joshi (2013) agreed that IP-Traceback schemes that didn't support fragmented IP traffic were prone to the occurrence of high false positives. Correspondingly, tests conducted by Yao and Vasilakos (2015) showed that using a passive IP Traceback scheme required no involvement from the ISPs and such a scheme was able to pinpoint the origin of a computer system using a spoofed IP address. Hence, the inventor has chosen to integrate a hybrid IP-Traceback scheme into the OCA's design.

The inventor's proposed hybrid IP-Traceback Module (IPTM) is comprised of a fusion of the following: 1) the Flexible Deterministic Router and Interface Marking (FDRIM) scheme, which is based on the DFMT model that uses a packet marking approach and supports fragmented packets and 2) the Passive IP Traceback (PIT) scheme (FDRIM-PIT), which doesn't require ISP deployment or involvement and is able to identify hosts using spoofed IP addresses. This proposed hybrid IPTM is incorporated into the SIEM system, which is hosted by the CTAM.

In essence, the OCA would use the proposed hybrid IP-Traceback scheme to determine the authenticity or legitimacy of the public and private IP addresses associated with the cyber attacker's network-edge device and computer system used to instigate the cyber attack. The authenticity of a cyber attacker's public and private IP addresses is established in order to 1) assist the OCA in formulating and creating genuine AI/ML-based cyberbots capable of accurately pinpointing or discovering specific hardware devices interconnected to that cyber attacker's LAN and 2) validate and accurately pinpoint or discover a cyber attacker's geolocation. Fundamentally, the OCA would use the proposed hybrid IP-Traceback scheme to ascertain with certainty that the cyber attacker's network-edge device and computer system used to instigate the cyber attack are precisely distinguishable devices (i.e., that are not bots, pseudo computers, or rogue systems using spoofed IP addresses).

The $2^{nd}$ phase of the cracking-the-perimeter episode involves conducting passive fingerprinting via multiple, virtualized, autonomous, AI/ML-based dynamic research Honeynets (i.e., multiple, virtualized, autonomous, high-interaction, AI/ML-based Research Honeypots and HoneyClients or "Client Honeypots" configured as an integrated network). The Honeynets are programmed to independently operate in their assigned horizontal-scalable synchronized VMs. Moreover, the Honeynets' Honeypots and HoneyClients are used to conduct both client-side and server-side passive fingerprinting. Examples of passive fingerprinting techniques are briefly discussed in the forthcoming descriptions outlined in the $4^{th}$ and $5^{th}$ phases.

The $3^{rd}$ phase of the cracking-the-perimeter episode involves using a vast array of autonomous AI/ML-based Drive-by cyberbots, to conduct both active and passive fingerprinting. These Drive-by cyberbots are fundamentally custom-developed AI/ML-based self-learning cyber spiders that are specifically embedded within documents and files hosted by the custom-developed research Honeynets' dynamic Honeypots and HoneyClients. Furthermore, these Drive-by cyberbots are programmed to automatically and covertly traverse and penetrate a cyber attacker's LAN and hosted devices (e.g., computer used to instigate the cyber attack and discovered interconnected peripheral smart devices) via any identifiable open TCP and UDP ports and subsequently report on exploitable vulnerabilities associated with the cyber attacker's LAN and interconnected networked devices; this phase-3 directive is automatically initiated, whenever the OCA identifies the occurrence of an external or internal cyber attack. All AI/ML-based cyberbots, including Drive-by cyberbots, are programmed to undertake and infiltrate different types of CPU architectures (i.e., embedded, microcomputer, workstation/server, mini/mainframe, and mixed-core CPU architectures).

Essentially, the AI/ML-based Drive-by cyberbots are programmed to automatically and covertly transport their specialized auto-executable payloads and have those payloads executed upon arriving at their targeted destinations (i.e., the network-edge device, computer system used to instigate the cyber attack, and discovered peripheral smart devices interconnected to the cyber attacker's LAN respectively). Similar to the fundamental AI/ML-based cyberbots, the autonomous AI/ML-based Drive-by cyberbots' specialized payloads are primarily comprised of memory-, kernel-, firmware-, and/or hypervisor-based rootkits. These rootkits in turn are composed of autonomous AI/ML-based RATs and C2 Malware, which are designed to carry AI/ML-based, self-randomized, self-encrypted, self-destructive, polymorphic-shellcode payloads. For example, the AI/ML-based Drive-by cyberbots are programmed to conduct analyses of the Trusting Computing Base (TCB)—i.e., the aggregation of all of a computer system's hardware, firmware, and software components used to secure its environment by enforcing security policies to ensure adequate security of that system and its information—associated with the network-edge device, computer system used to instigate the cyber attack, and discovered peripheral smart devices interconnected to the cyber attacker's LAN respectively.

Fundamentally, the AI/ML-based Drive-by cyberbots are autonomously generated via the CSE and are used to promote covert access and remote control of the network-edge device, computer system used to instigate the cyber attack, and discovered peripheral smart devices interconnected to the cyber attacker's LAN respectively. Moreover, they are also used by the CAM to assist in the buildout of the TCM (which is later discussed in the forthcoming Cyber Attack Module section) and are embedded into strategically positioned files being hosted by the CTAM's Honeypots and HoneyClients. All generated cyberbots are programmed using the omelette-egg-hunter-shellcode scheme, whereby small bits of source code is injected into the process, rebuilt into a single block, and successively executed, once the cyberbots have successfully penetrated or circumventd the encountered information security controls instituted by the cyber attacker's networked devices (see TCP and UDP packet sizes under the "Networking" section).

The AI/ML-based Drive-by cyberbots are programmed to carry specialized auto-executable payloads that perform local primary active fingerprinting behind the cyber attacker's firewall, once delivered. However, local primary active fingerprinting is only performed, if conducting active fingerprinting in front of the cyber attacker's firewall is blocked by information security controls instituted by security-based components being hosted by the cyber attacker's LAN (e.g., firewall, IDS/IPS, etc.). In such a case, local primary active fingerprinting would involve using techniques such as low-bandwidth ping sweeping (to covertly identify which hosts on the cyber attacker's LAN are alive), covert port scanning (e.g., TCP idle scan to clandestinely determine what ports are opened on a particular device), and vulnerability scanning (to identify exploitable vulnerabilities associated with a particular device or host).

The AI/ML-based Drive-by cyberbots' specialized auto-executable payloads are also programmed to create backdoors and subsequently setup communication links between the cyber attacker's targeted hardware and the OCA, prior to the OCA's commencing its network- and system-vulnerability reconnaissance and enumeration processes. Data collected from the network- and system-vulnerability reconnaissance and enumeration processes (e.g., discovered vulnerabilities along with private and public IP addresses and their associated opened TCP/UDP ports and Media Access Control (MAC) addresses) and hybrid IP-Traceback scheme (described in the 1 phase of the cracking-the-perimeter episode) are used to substantiate the validity of the IP addresses linked to the cyber attacker's network-edge device and computer system used to instigate the cyber attack.

The 4$^{th}$ phase of the cracking-the-perimeter episode involves having the CTAM's hosted autonomous hybrid HIDS/HIPS/SIEM-IPTM also conduct passive fingerprinting. In such a case, the proposed SIEM system is instituted using an AI/ML-based hybrid User Event Behavioral Analysis (UEBA) and Security Orchestration and Automation (SOAR) technological framework. Whereas UEBA would leverage AI and deep learning techniques to identify cognitive human behavioral patterns and trends in order to effectively detect cyber threats and targeted cyber attacks, SOAR would promote automated incident response. For example, if the SOAR's component detected a ransomware alert, the SIEM system would autonomically perform steps to contain the identified the compromised system, before the cyber attacker is able to encrypt any targeted data.

Comparatively, whereas the HIDS acts as a passive, continuously-active, data-collection tool, the HIPS acts as a sporadic temporary inhibitor that works in tandem with the HIDS to intermittently block access to the Honeynet's content. The process of sporadically inhibiting or blocking access to a Honeynet's content by the HIPS is performed in order to further entice the cyber attacker by temporarily mimicking preventative security controls.

The 5$^{th}$ phase of the cracking-the-perimeter episode involves conducting supplementary passive fingerprinting. This supplementary passive fingerprinting includes using techniques such as browser fingerprinting, Cookie-like fingerprinting, DNS fingerprinting, OS fingerprinting, and packet sniffing. It also involves Stream Control Transmission Protocol (SCTP), Transmission Control Block (TCB), Indicators of Attack (IoA), and Indicators of Compromise (IoC) analyses. These aforementioned supplementary passive fingerprinting techniques are instigated by the Honeynets' Honeypots and HoneyClients.

The last or final phase of the cracking-the-perimeter episode involves sparingly conducting supplementary active fingerprinting in front of the cyber attacker's firewall. While both active and passive fingerprinting techniques are used throughout the cracking-the-perimeter-episode procedure, greater emphasis is placed on passive fingerprinting techniques so as to promote covertness and inconspicuousness. Supplementary active fingerprinting involves using the same active fingerprinting techniques previously mentioned, but also includes using other techniques such as Cross-Site Scripting (XSS) and Directional Traversal schemes.

All supplementary active fingerprinting techniques are designed to be conducted over an extended random time period (e.g., 1 port probe every 1 to 86,400 seconds) via the OCA's TCM and camouflaged or obfuscated with legitimate traffic using a magnitude of spoofed IP address to mitigate or minimize discovery. Essentially, active fingerprinting is conducted via a Virtual Private Network (VPN) that is facilitated via The Onion Router (TOR) network (i.e., a secure network based on TOR paradigm used to promote anonymous communication) in order to be as surreptitious and unobtrusive as possible. In addition, the HoneyClients are also programmed to perform server-side active fingerprinting (e.g., IDLE port scans that use spoofed IP addresses) to assist in identifying "zombie" hosts, if or when appropriate.

The CTAM ensuingly takes the data extrapolated from the cracking-the-perimeter-episode procedures previously described, successively aggregates these data, and subsequently passes the aggregated dataset (along with the originally created AI/ML-based Drive-by cyberbots) to the OCA's ODBMS and CSE to be stored and processed respectively (illustrated as data flow 3 in FIGS. 2 and 3).

Cyber Spider Engine or CSE:

Similar to the CTAM, the CSE is also designed to operate in a designated virtualized environment consisting of multiple, horizontal-scalable, synchronized VMs. It is based on an autonomous, hybrid, AI/ML-based ANN architecture that is used to promote machine-, deep-, and self-learning processes via AI/ML-based algorithms. These AI/ML-based algorithms when executed, coalesce to create an autonomous, hybrid, AI/ML-based ANN. This autonomous, hybrid, AI/ML-based ANN is comprised of an aggregation or mash-up of three different ANNs. This mash-up or hybridity is composed of the following:

i. An Autoencoder ANN (AANN), which is a three-layered, unsupervised ANN that institutes an encoder and decoder.

ii. A Cascade-Correlation ANN (CCANN), which is a supervised, feed-forward machine-learning ANN that uses a Fuzzy Interference System (FIS) machine-learning algorithm to determine the number of nodes in its hidden layer based on the value of the correlation coefficient.

iii. A Deep Q-Network or DQN, which is comprised of reinforcement machine-learning and deep-Q-learning algorithms. When these algorithms are combined with a different ANN, it promotes the learning of sequential behaviors by propagating rewards to interconnected states and actions, whenever a good behavior is generated or recognized.

Whereas the OCA's AANN is used to provide the framework for dimensionality reduction, its CCANN is used to provide a framework for accelerated continuous learning in real time without the need for backward propagation. Furthermore, the OCA's DQN is used to remove correlations in the observable sequences within the constructed ANN framework, in order to smooth changes in the data distribution. The DQN's primary task is to stabilize the learning capabilities within both the AANN and CCANN neural networks.

One of the CSE's primary functions is to formulate, synthesize, and generate autonomous or autonomic synchronized AI/ML-based cyberbots. These cyberbots include the synchronized ACDs, InCDs, DCSs, and Drive-by cyberbots that manifest as the previously described RATs and C2 Malware (presented in the 3$^{rd}$ phase of cracking-the-perimeter episode as outlined under Cyber Threat Assessment Module section of the Artificial Intelligence Layer heading). As earlier mentioned, these autonomous AI/ML-based cyberbots are fundamentally diminutive AI/ML-based cyber spiders that are created to perform specific and unique tasks. For example, the InCDs primary function is to carry out SRE using specially developed probes to discover latent exploitable vulnerabilities and to validate the authenticity of targeted networked devices' IP addresses (i.e., network-edge device, computer system used to instigate the cyber attack, and peripheral smart devices interconnected to the cyber attacker's LAN). Conversely, the clusters of synchronized DCSs' primary function is to carry out APT-based CoCs aimed at targeting and neutralizing or eradicating the aforementioned networked devices interconnected to the cyber attacker's LAN.

However, an APT-based CoC is only initiated when the OCA detects the occurrence of an external (Internet-based) cyber attack. In cases whereby the OCA has detected the occurrence of an internal or in-house cyber attack, it signals the preinstalled CTI agent on the host initiating the cyber attack to segregate or isolate that particular host from the company's network (i.e., sever or disunite the communications link between that host's NIC and the company's LAN/WAN). In addition, the OCA would subsequently alert the cyber threat division of the company's Network Operations Center (NOC), Security Operations Center (SOC), or Information Technology (IT) department to schedule an offline, investigative, computer-forensic analysis and audit for the distinctively identifiable host.

Figure 6:
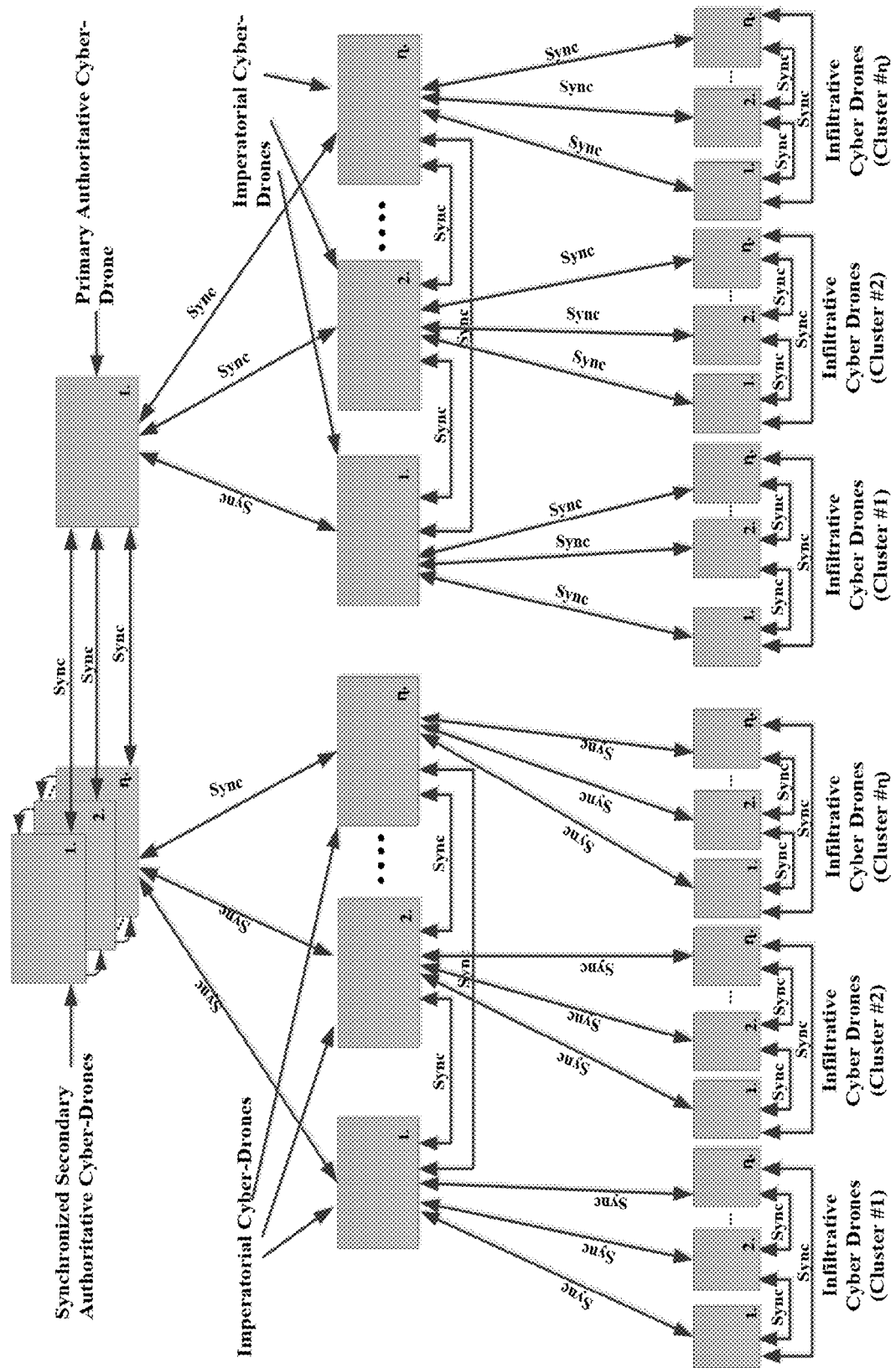
FIG. 6 is an architectural diagram that illustrates the synchronicity between the synchronized Primary Authoritative Cyber Drones (PACDs), Secondary Authoritative Cyber Drones (SACDs), Imperatorial Cyber Drones (ImCDS), and clusters of Infiltrative Cyber Drones (InCDs) in accordance with the present invention.
Figure 7:
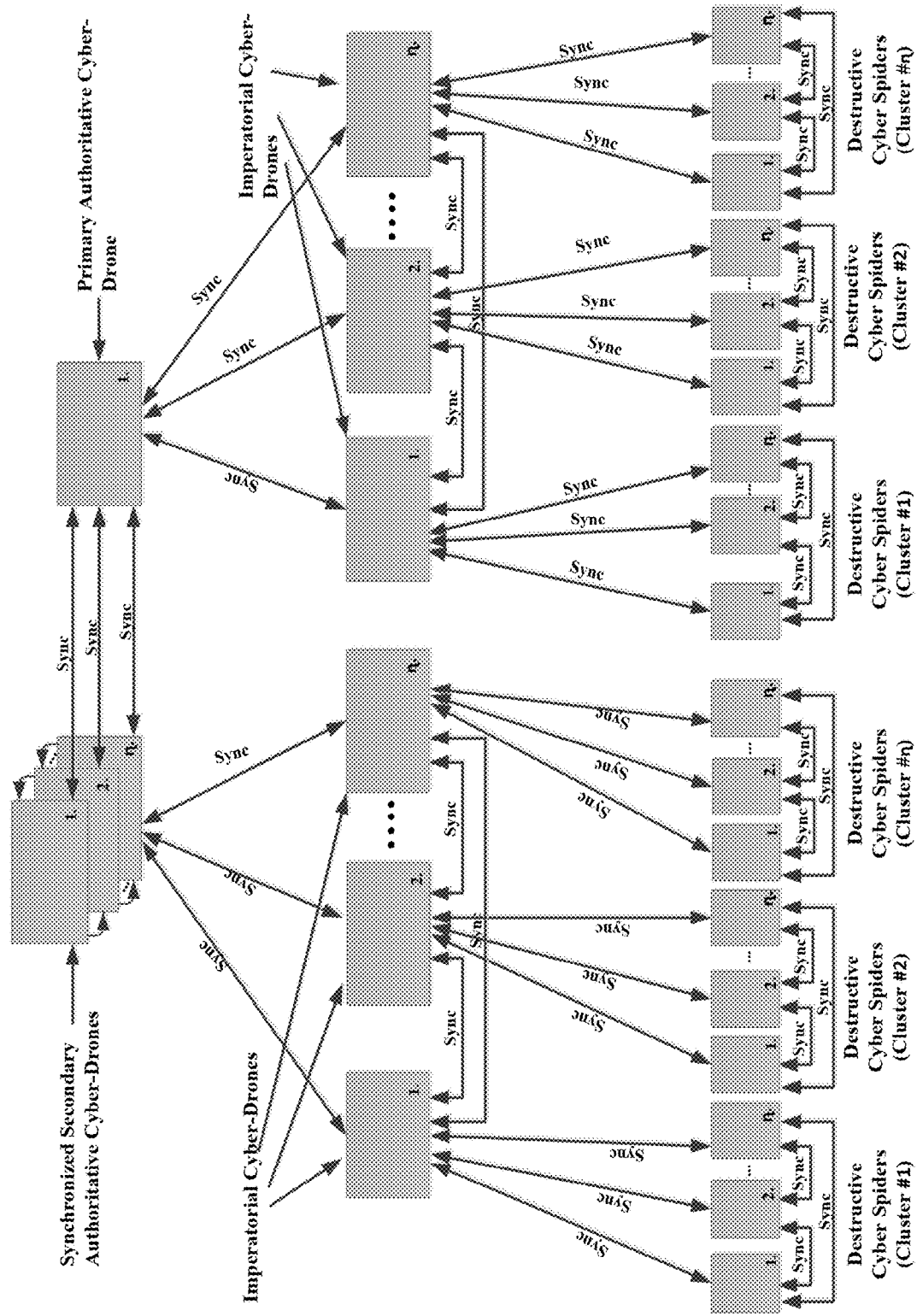
FIG. 7 is an architectural diagram that illustrates the synchronicity between the synchronized PACDs, SACDs, ImCDs, and clusters of Destructive Cyber Spiders (DCSs) in accordance with the present invention.
Figure 8:
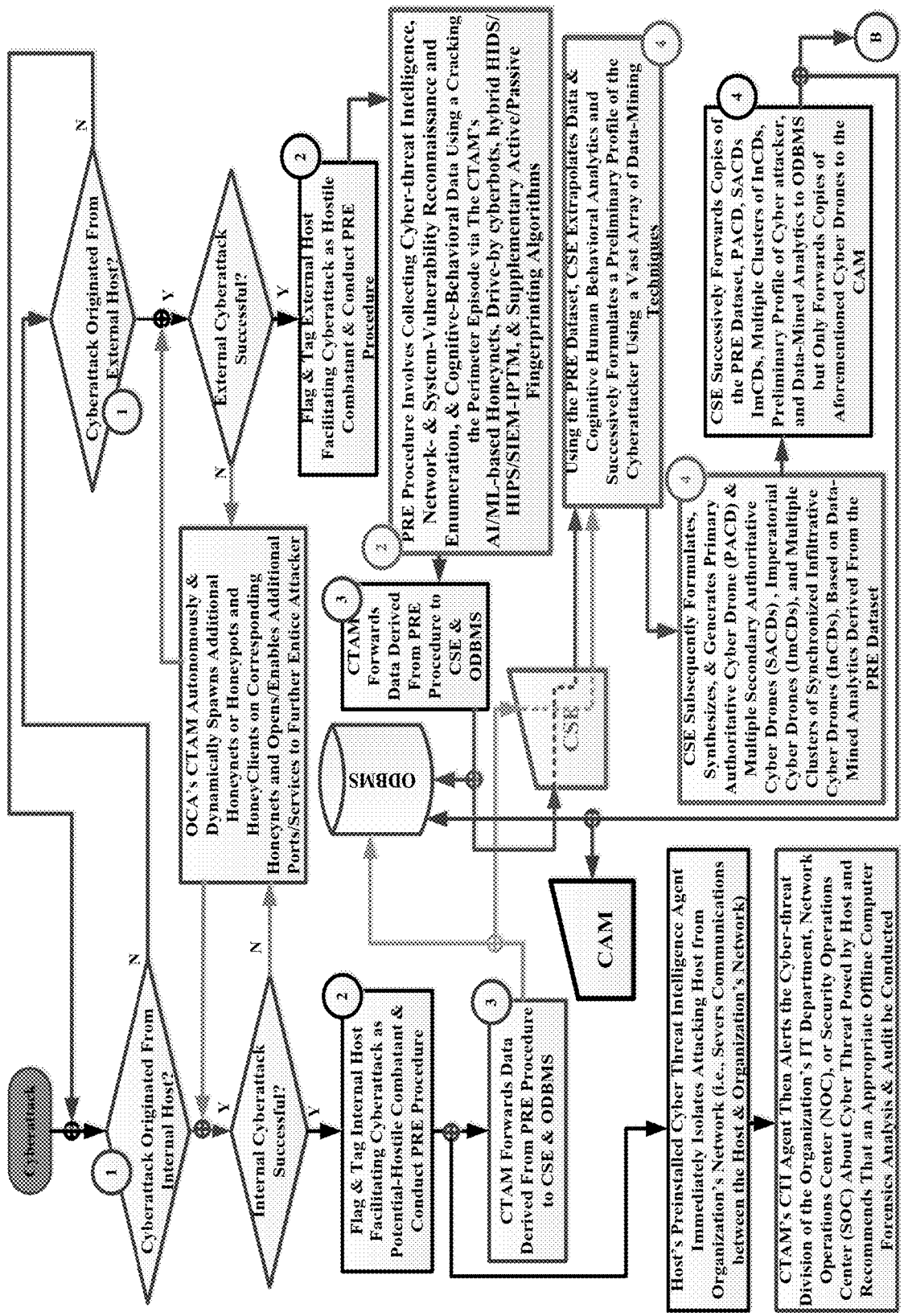
FIG. 8 is a data flow diagram that illustrates the functionality of the OCA at the onset of a cyber attack in accordance with the present invention.
Figure 9:
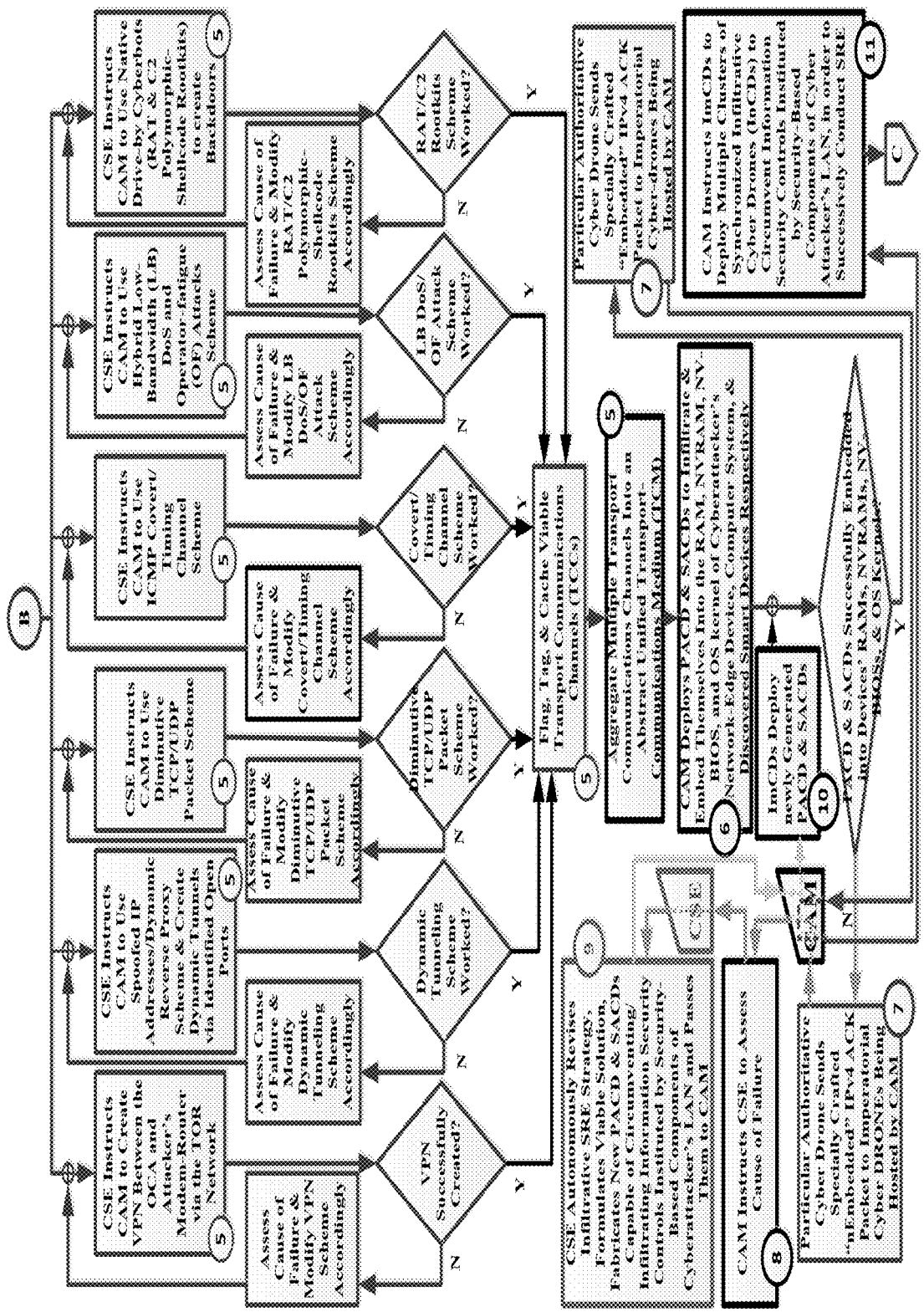
FIG. 9 is a data-flow diagram that illustrates the formulation of the abstract data Transport and Communications Medium (TCM) used by the OCA as a virtual transportation medium for its cyberbots in accordance with the present invention.
Figure 10:
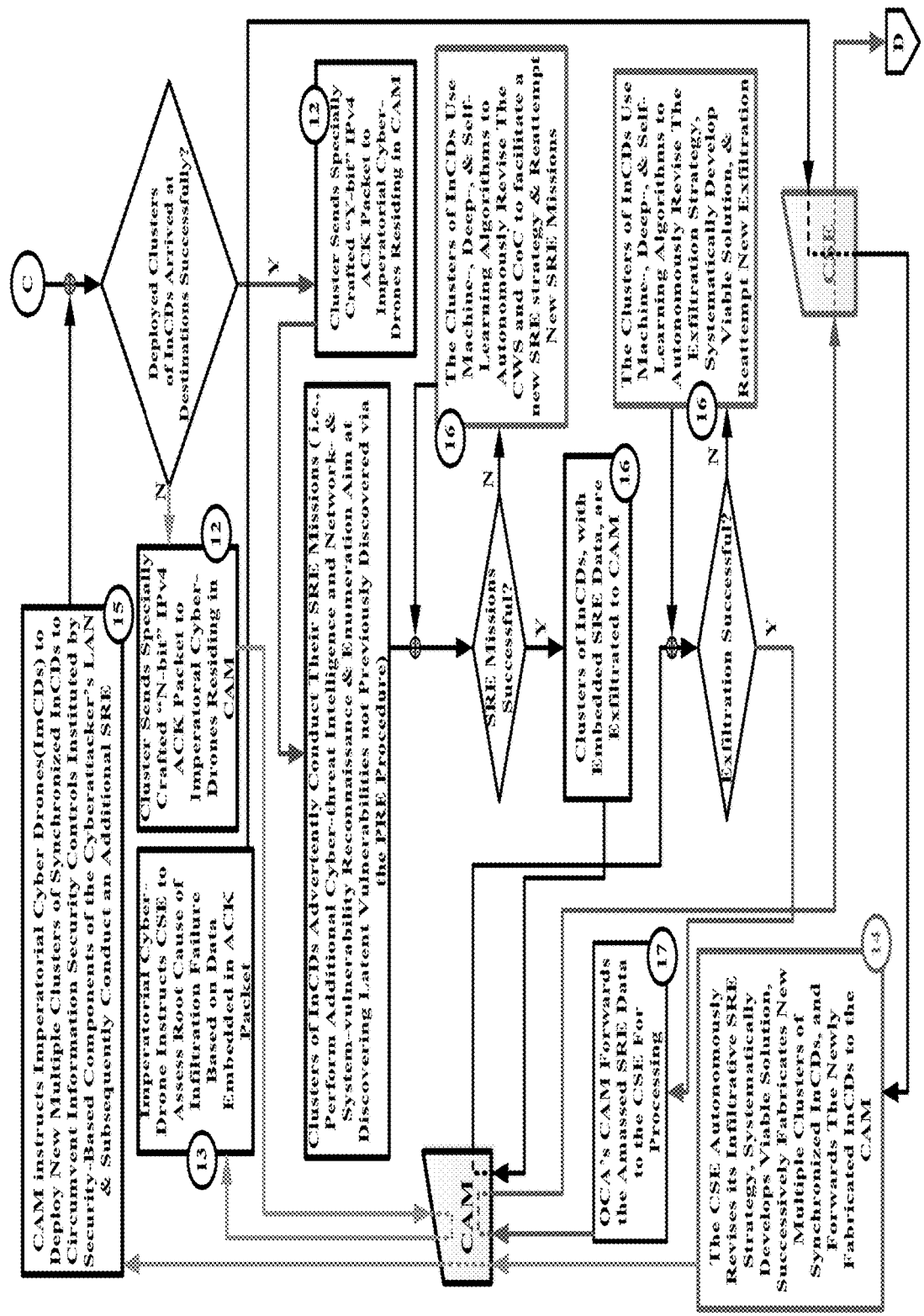
FIG. 10 is a data-flow diagram that illustrates the effects or outcome of the OCA's reliability assessments of its deployed InCDs and SRE missions in accordance with the present invention.
Figure 11:
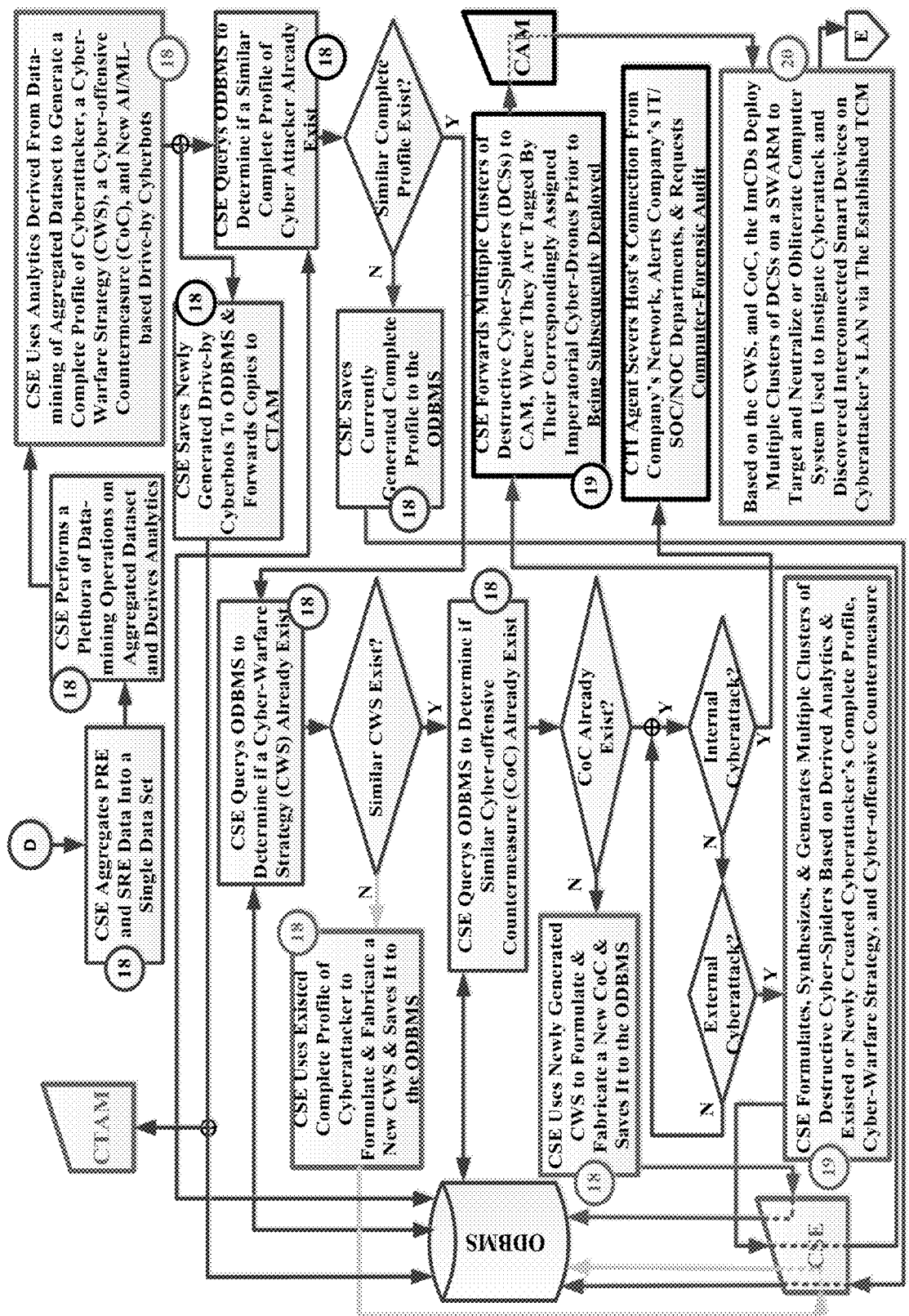
FIG. 11 is a data-flow diagram that illustrates the logistical processes used by the OCA to generate the CWS, APT-based Cyber-offensive Countermeasure (CoC), and synchronized cluster of DCSs based on derived data-mined data and cognitive human behavioral analytics in accordance with the present invention.
Figure 12:
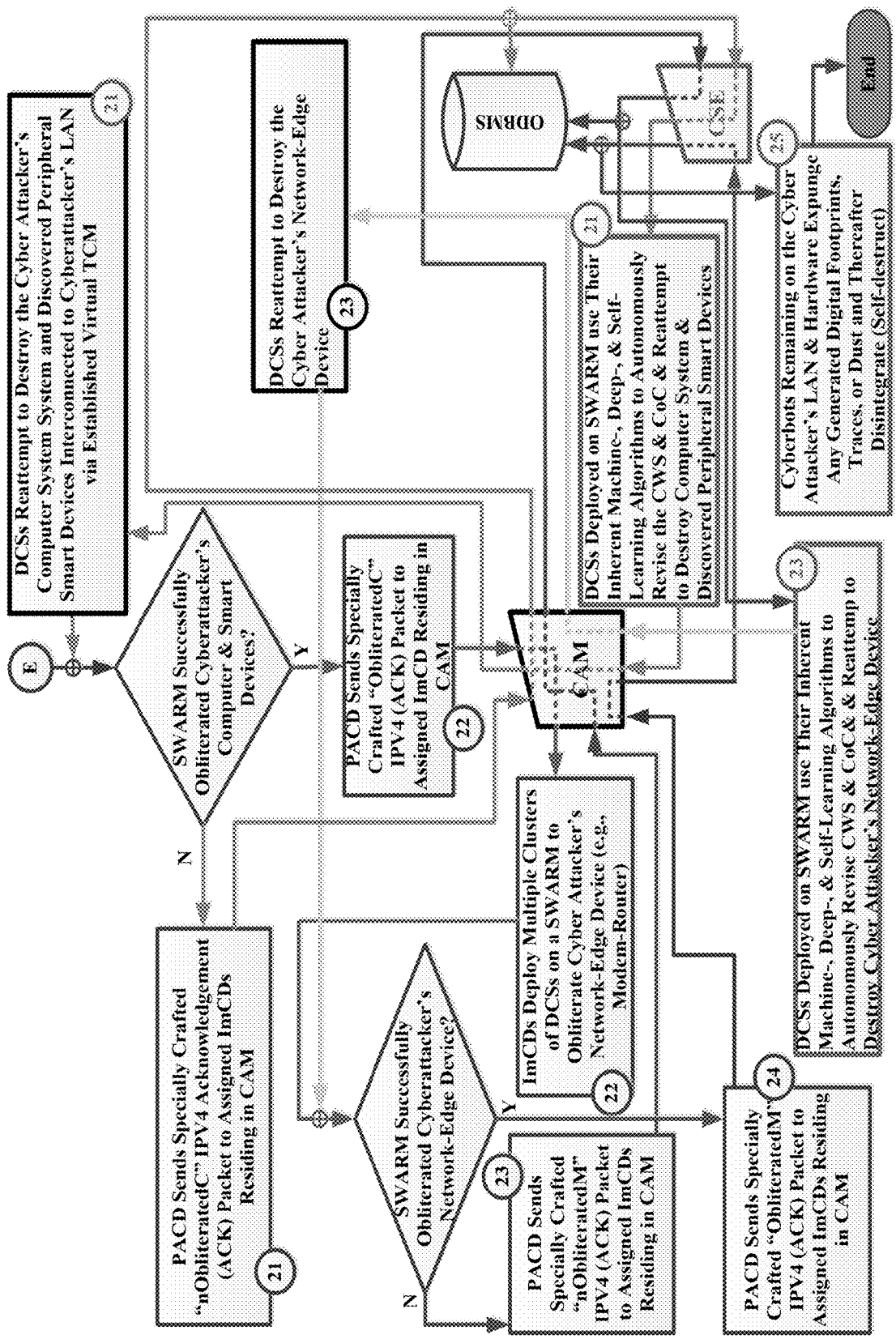
FIG. 12 is a data-flow diagram that illustrates the logistical destructive processes facilitated by the OCA's generated DCSs, along with the associated attestation, reliability, and housekeeping functions in accordance with the present invention.

The CSE's primary objectives are to:

i. Use the PRE dataset generated by the CTAM (illustrated as data flow 3 in FIGS. 2 and 3) as perquisite to perform a plethora of data-mining techniques or operations. These data-mining techniques or operations are used to extrapolate data and cognitive human behavioral analytics to assist in 1) identifying cyber threat intelligence, 2) identifying network and system vulnerabilities, and 3) formulating the preliminary and complete profiles of the cyber attacker. The data-mining techniques are based on the use of the following methods: Data cleaning & preparation, tracking patterns, classification, association, outlier detection, regression, prediction, sequential patterns, decision trees & Fuzzy logic, both quantitative & qualitative statistical techniques, visualization (that allows for dashboarding), neural networks, data warehousing (historic and in-depth, real-time analysis), long-term memory processing (historic data stored in data warehouse), machine learning, deep learning, and artificial intelligence.

ii. Formulate and generate a preliminary profile of the cyber attacker, based on the analytics derived from the aforementioned data-mining operations specified in process i. The cyber attacker's preliminary profile is based on cognitive human behavioral patterns and trends derived from these analytics. Furthermore, the established cognitive human behavioral patterns and trends are founded on the Case Linkage Theory and include a taxonomy of the following: 1) An understanding of the cyber attacker's or perpetrator's cyber attack methodology and preferences (i.e., Tactics, Techniques, and Procedures (TTPs) including who, why, what type of attack, and how it was carried out), 2) The cyber attacker's exact geolocation, 3) The cyber attacker's identifiable network/system components (e.g., hardware, firmware, kernel, hypervisor, and software with associated versions, etc.) and associated vendor-specified hardware metrics, 4) the exploitable vulnerabilities associated with the cyber attacker's network-edge device, computer system used to instigate the cyber attack, and discovered peripheral smart devices interconnected to the cyber attacker's LAN respectively, and 5) the effects caused by the cyber attacker's malicious actions such as how the cyber attack carried out by the cyber attacker affected the virtualized DRH's environments in terms of confidentiality, integrity, and availability based on the National Institute of Standards and Technology's (NIST's) Common Vulnerability Scoring System (CVSS) latest version.

iii. Formulate, synthesize, and generate specific AI/ML-based cyberbots (i.e., synchronized PACDs, SACDs, ImCDs, and multiple clusters of InCDs) based on the analytics derived in process i.

iv. Subsequently forward the aforementioned data-mined analytics derived from process i, preliminary profiles specified in process ii, AI/ML-based cyberbots specified in process iii, and the PRE dataset forwarded from the CTAM to the ODBMS to be stored and archived. It also forwards copies of the AI/ML-based cyberbots generated in process iii to the CAM. These processes are illustrated as data flows 4 and 5 in FIGS. 2 and 3).

v. Autonomously instruct the PACDs and SACDs generated in process iii to synchronize and tagged to specifically assigned ImCDs, which in turn are synchronized and tagged to multiple clusters of forthcoming synchronized InCDs. FIG. 6 illustrates this synchronous relationship between the synchronized PACDs, SACDs, ImCDs, and the multiple clusters of InCDs. The synchronized ACDs are programmed to take up residency and unleash their AI/ML-based payloads in the RAM/NVRAM/NV-BIOS memory and OS kernel of the modem-router, computer system used to instigate the cyber attack, and discovered peripheral smart devices interconnected to the cyber attacker's LAN.

vi. Work in tandem with the CAM to formulate and create a secure TCM, which the OCA uses as the blueprint for an infiltrative strategy (illustrated as data flow 5 in FIGS. 2 and 3). The CAM successively uses the derived analytics described in process i to setup the TCM (including backdoors); it also places the AI/ML-based cyberbots specified in process iii on a hold-and-wait state and later have them deployed by their specifically assigned ImCDs. The OCA subsequently uses the TCM as the transportation and communications engine for its system-generated cyberbots. In addition, the CSE collaboratively works with the CAM, CTAM, and ODBMS to promote the storing and archiving of all files and objects generated by itself, CAM and CTAM.

vii. Solicit the CAM to instruct the synchronized ImCDs to deploy the PACDs and SACDs, once process vi has been successfully performed and established (illustrated as data flow 6 in FIGS. 2 and 3). Whereas a PACD is programmed to embed itself into the RAM, NVRAM, NV-BIOS, and OS kernel of the cyber attacker's network-edge device, the SACDs are programmed to embed themselves into the RAM, NVRAM, NV-BIOS, and OS kernel of the cyber attacker's computer system used to instigate the cyber attack and discovered peripheral smart devices interconnected to the cyber attacker's LAN respectively. Immediately after deployment, the ImCDs intrinsically starts to monitor the activities of the deployed ACDs via synchronous low-frequency heartbeat and keepalive signals.

viii. If the PACD and SACDs are unsuccessful in their quest, the CAM autonomously instructs the CSE to perform the following: 1) Conduct an assessment to determine the cause of failure, 2) Formulate a viable solution, 3) Revise its infiltrative SRE strategy, 4) Fabricate new PACD and SACDs capable of successfully circumvent the identified information security controls, and 5) Subsequently pass the newly-generated PACD and SACDs to the CAM for redeployment (illustrated as data flows 7, 8, 9, and 10 in FIGS. 2 and 3).

ix. Solicit the CAM to instruct the ImCDs to deploy synchronized clusters of InCDs via the established TCM, if the PACDs and SACDs are successful in their quest and synchronicity between the PACD, SACDs, and ImCDs has been demonstrably accomplished. These synchronized InCDs are programmed and deployed to circumvent discovered information security controls instituted by security-based components (e.g., firewall, IDS/IPS, etc.) hosted by the cyber attacker's LAN. They are also programmed to successively perform a SRE procedure or mission (illustrated as data flow 11 in FIGS. 2 and 3). The SRE procedure or mission is based on the premise that the clusters of InCDs have conducted their network- and system-vulnerability reconnaissance and enumeration successfully. Moreover, the SRE mission involves having the clusters of synchronized InCDs autonomously conduct both active and passive fingerprinting behind the cyber attacker's firewall.

x. Perform an assessment as to why the synchronized clusters of InCDs were unsuccessful (should this occur) in their quest to collectively perform their tasks based on the associated returned ACK-packet's parameters. These processes are illustrated as data flows 12 and 13 in FIGS. 2 and 3.

xi. Autonomously revise its infiltrative SRE strategy, systemically develop a viable solution, and successively formulate, synthesize, and generate new multiple clusters of synchronized InCDs and have them synchronize to their specifically assigned ImCDs (illustrated as data flow 14 in FIGS. 2 and 3), based on the occurrence of process ix. The new multiple clusters of synchronized InCDs are successively forwarded to the CAM to be deployed.

xii. Solicit the CAM to instruct the ImCDs to deploy the new multiple clusters of synchronized InCDs, via the established TCM, on a new SRE mission (illustrated as data flow 15 in FIGS. 2 and 3), based on the occurrence of process x.

xiii. Take the SRE data that the CAM collectively harvested, amassed, and aggregated from the exfiltrated InCDs (based on the premise that the deployed synchronized clusters of InCDs successfully conducted their SRE mission) and process the aggregated SRE data. This process involves processing the aggregated SRE data using the data-mining techniques or operations specified in process i to generate cyber threat assessment and network- and system-vulnerability reconnaissance and enumeration analytics associated with the cyber attacker's network infrastructure (illustrated as data flows 16 and 17 in FIGS. 2 and 3). The OCA successively uses these derived analytics to validate the analytics already extrapolated from the PRE dataset in process i., in order to verify that a cyber attacker's actual coordinates (i.e., geolocation and public and private IP addresses associated with networked devices interconnected to their LAN) and system-vulnerability metrics are accurate.

xiv. Successively aggregate the PRE and SRE data into a unified dataset, perform the same multiple data-mining operations specified in process i on the aggregated PRE-SRE dataset, and extrapolate applicable data and cognitive human behavioral analytics. These analytics are successively used to identify any latent cyber threat intelligence, network and system vulnerabilities, and attributes relating to the cyber attacker's profile. There are also subsequently compared and combined with the analytics generated in i. and the combined analytics are used to formulate and generate a complete profile of the cyber attacker, a new CWS, and a new APT-based CoC. The CSE then uses the combined CWS and APT-based CoC as a framework to formulate, synthesize, and generate new AI/ML-based Drive-by cyberbots and multiple clusters of synchronized DCSs. Moreover, the CSE successively saves the cyber attacker's complete profile, CWS, APT-based CoC, and Drive-by cyberbots to the ODBMS. Additionally, the CSE also forwards copies of the newly generated Drive-by cyberbots to the CTAM (where they are subsequently embedded into files being hosted by established Honeypots and HoneyClients) and clusters of synchronized DCSs to the CAM to be deployed (illustrated as data flows 18 and 19 in FIGS. 2 and 3).

xv. Solicit the CAM to instruct the ImCDs to initiate synchronicity with the multiple clusters of synchronized DCSs, as illustrated in FIG. 7. Using the devised APT-based CoC, the CSE solicits the CAM to deploy the CWS, via the established TCM, on a SWARM (illustrated as data flow 20 in FIGS. 2 and 3). For example, the SWARM involves having the clusters of synchronized DCSs preemptively attack and corrupt the firmware associated with the Central Processing Unit (CPU), Graphics Processing Unit (GPU), Random Access Memory (RAM), Complementary Metal-Oxide-Semiconductor (CMOS), Basic Input-Output System (BIOS), and Power Control Units (PCUs) associated with the cyber attacker's networked devices.

Unlike other AI/ML-based cyberbots' payloads, which are comprised of solely polymorphic shellcode, the DCSs' payloads are hybrid payloads that are comprised of both polymorphic shellcode and microcode. This microcode is generated via VHDL and are used to manipulate integrated circuits' registers and combination logic (aka logic gates) for a plethora of microarchitectures (e.g., x86, x64, ARM, ARM64, PowerPC, etc.). Components of these microarchitecture may include a system's or device's CPU, RAM, CMOS, BIOS, PCU, TPM, etc.

The system-generated CWS outlines an abstraction of the APT-based CoC, which is designed to incorporate the use of multiple, offensive, counterattack initiatives. These initiatives in turn are comprised of both primary and secondary offensive counterattacks, which the OCA uses to facilitate the destruction of the cyber attacker's networked devices. For example, a primary offensive counterattack initiative may involve the use of multiple simultaneous or blended attacks such as Time-of-check/Time-of-use (TOC/TOU), race condition, cryptographic, and timing analysis attacks to inconspicuously supplement the PRE and SRE data-collection processes (i.e., to help collect and verify data relating to the CPU/GPU/RAM/CMOS/BIOS/PCU firmware associated with the cyber attacker's networked devices). Contrastingly, a secondary offensive counterattack initiative may involve the use of multiple simultaneous or blended attacks such as side-channel, differential power analysis, electromagnetic, microprobing, and overvolting/overclocking attacks to destroy microelectronics and firmware associated with the cyber attacker's networked devices.

The secondary offensive counterattack initiative is instigated by manipulating the PCUs associated with the cyber attacker's networked devices. For example, most BIOS firmware typically include elements such as an Unified Extensible Firmware Interface (UEFI), hard drive or solid state drive firmware (e.g., Aggressive Link Power Management or ALPM), and a video BIOS of the graphic card associated with the cyber attacker's computer system. In addition, the BIOS associated with the typical network-edge device such as a modem-router typically include elements such as LibreCMC, IPFire, OpenWrt, fli41, or mOnOwall firmware. In addition, the OCA is designed to keep an updated database of all best-practice utilized firmware (such as those previously mentioned) and autonomously program its clusters of synchronized DCSs to target and neutralize those specific firmware.

Moreover, the InCDs also have the ability to infiltrate and control commonly used systems' OS kernels. Because the OS kernel associated with computer systems and network devices has direct access to those systems' modules, firmware, and hypervisors, infiltrating and controlling the kernel allows the specialized payloads delivered by the InCDs to setup backdoors and take control of systems' device controllers, regulatory modules, firmware, and hypervisors. For example, most modern computer systems typically have a hypervisor integrated into their OS's kernel and most modern electronic devices' controllers and regulatory modules are largely integrated into the primary-powered and sub-powered PCUs of those systems and devices. Furthermore, PCUs are generally interconnected directly or indirectly to electronic devices' vital components (e.g., CPU, GPU, RAM, BIOS, CMOS, CPU's fan or CPU's system-cooling mechanism, monitor or display unit, TPM microcontroller microchips, and all essential components or circuitries that require electrical power to function).

By taking control of a system's OS kernel, via installed specialized payloads delivered by the InCDs, this allows the OCA to perform the following: 1) Alter the Intelligent Platform Management Interface (IPMI), which is a microprocessor used to configure and control firmware power-management capabilities, 2) Corrupt or destroy specific microprocessors' registers (e.g., Model Specific Register (MSR), Control and Status Register (CSR), and Memory-Mapped Input/Output (MMIO)), which are used as the mechanism by modern electronic devices to facilitate communications between software and hardware to control and configure the PCUs' parameters, and 3) Corrupt or destroy the "Node Manager", which is a mechanism comprising of two microcontrollers—the Baseboard Management Controller (BMC) and the Management Engine (ME)—that are vital for power management (e.g., temperature and power capping features for CPU, GPU, and memory subsystem domains) of modern-day electronic devices.

Two other prominent methods that the OCA uses to corrupt or destroy the aforementioned registers within microprocessors are overvolting and overclocking schemes. These overvolting and overclocking schemes are promoted via the DCSs' microcode payloads. Additionally, these microcode payloads are programmed to corrupt or destroyed registers associated with the CPU, GPU, RAM, CMOS, BIOS, and PCU microprocessors by facilitating the overheating of these aforementioned components. Similarly, overvolting and overclocking of monitors, Smart TVs', and IoT devices' core internal electronic components, are conducted by inciting frequencies way beyond the factory recommended specifications (e.g., immensely increasing their out-of-range or frame frequencies) for a prolonged timeframe.

While the OCA's primary goal is to obliterate the cyber attacker's computer system used to instigate the cyber attack, discovered peripheral smart devices, and network-edge device interconnected to the cyber attacker's LAN respectively, it is also contrastingly tasked with inaugurating a self-preservation initiative. This self-preservation initiative is instituted via the CTAM's autonomous self-defense or protective mechanisms. These protective mechanisms include the following: 1) The enactment of a heuristic AI/ML-based autonomous hybrid HIDS/HIPS/SIEM-IPTM, 2) A vast array of encryption algorithms that are randomly used to encrypt data at rest or stored data, data in transit or dynamic data, and data in use or data that is loaded into the OCA's Random Access Memory (RAM), 3) System security features instituted by the OCA's TPM, and 4) An autonomous-auditing ability that is based on heuristic AI/ML-based algorithms.

Having an autonomous-auditing ability allows the OCA to effectively formulate a real-time protective strategy. This real-time protective strategy is used as a directive to mitigate a stupendous range of external or Internet-based cyber attacks. For example, the OCA (by design) inherently has the ability to contain cyber attacks such as covert timing, side-channel, cryptographic, TOC/TOU, race condition, and zero-day cyber attacks.

xvi. Perform an assessment as to why the multiple synchronized clusters of DCSs described in process xiv were unsuccessful (should this occur) in their endeavor to target and neutralize or obliterate the cyber attacker's computer system used to instigate the cyber attack and discovered peripheral smart devices interconnected to the cyber attacker's LAN respectively (based on the associated returned ACK-packet parameters). That is, the CSE determines why the CWS and APT-based CoC were ineffective and autonomously takes the necessary corrective measures to formulate and generate new viable CWS and APT-based CoC (by redesigning and enhancing their logistical functions and features on the fly) and successively saves them to the ODBMS. These processes are illustrated as data flows 21 and 22 depicted in FIGS. 2 and 3.

xvii. Formulate, synthesize, and generate new clusters of synchronized DCSs, based on the newly generated CWS and APT-based CoC specified in process xv, and forward those new clusters of synchronized DCSs to the CAM for subsequent deployment (illustrated as data flow 23 depicted in FIGS. 2 and 3). Prior to being deployed, the DCSs are synchronized and tagged to specifically assigned ImCDs.

xviii. Solicit the CAM to instruct the ImCDs to deploy the newly generated clusters of synchronized DCSs described in process xvi on a SWARM via the established virtual TCM aimed at neutralizing or rendering the cyber attacker's computer system used to instigate the cyber attack and discovered peripheral smart devices interconnected to the cyber attacker's LAN respectively inoperable (illustrated as data flow 24 depicted in FIGS. 2 and 3).

xix. Solicit the CAM to instruct the ImCDs to deploy multiple clusters of synchronized DCSs on a SWARM via the established TCM aimed at neutralizing or rendering the cyber attacker's network-edge device inoperable. This process is based on the premise that process xvii is successfully executed (illustrated as data flow 25 depicted in FIGS. 2 and 3).

xx. Perform an assessment as to why the multiple clusters of synchronized DCSs described in process xviii were unsuccessful (should this occur) in their quest to collectively neutralize the cyber attacker's network-edge device, based on the associated returned ACK-packet parameters. That is, the CSE is programmed to determine why the CWS and APT-based CoC were ineffective and autonomously takes the necessary corrective measures to formulate and generate a new viable CWS and APT-based CoC (by redesigning and enhancing their logistical functions and features on the fly). After which, the CSE successively updates the ODBMS. However, if the deployed DCSs are successful on their SWARM endeavor, then the following will occur: 1) The CSE updates the ODBMS, 2) All cyberbots remaining on the cyber attacker's LAN collectively expunge their digital footprints, tracks, or dust, and 3) All cyberbots remaining on the cyber attacker's LAN successively disintegrate or self-destruct. These processes are illustrated as data flows 26 and 27 in FIGS. 2 and 3.

xxi. Formulate, synthesize, and generate new clusters of synchronized DCSs, if process xviii is unsuccessful. After which, the CSE automatically forwards the newly generated DCSs to the CAM to be deployed. Prior to being deployed, the newly generated DCSs are synchronized and tagged to specifically assigned ImCDs. This process is illustrated as data flow 28 in FIGS. 2 and 3.

xxii. Solicit the CAM to instruct the ImCDs to deploy the newly generated clusters of synchronized DCSs created in process xxi, via the established TCM, on another SWARM to target and neutralize or render the cyber attacker's network-edge device inoperable. This process is illustrated as data flow 29 in FIGS. 2 and 3.

Cyber Attack Module or CAM:

Similar to the CTAM and CSE, the CAM is also designed to operate in a designated virtualized environment consisting of multiple, horizontal-scalable, synchronized VMs. One of the CAM's primary objectives is to formulate, generate, and aggregate multiple virtual Transport and Communication Channels (TCCs). These TCCs are abstractly instituted using multiple, covert system-penetration schemes, which are subsequently aggregated to formulate the virtual TCM. In turn, the CAM uses this TCM as a modus to facilitate the OCA's SRE and APT-based CoC missions. In addition, the CAM also uses the TCM as a communicative conduit to deploy and establish continuous communications with all deployed AI/ML-based cyberbots. To promote its virtual TCM, the OCA uses the following system-penetration schemes that are based on:

i. Instituting the use of a VPN via the TOR network.

ii. Using randomly spoofed IP addresses in combination with a dynamic reverse proxy scheme to create UDP and TCP dynamic tunnels via any discovered or identified opened UDP and TCP ports associated with cyber attacker's network-edge device, computer system used to instigate the cyber attack, and discovered peripheral smart devices interconnected to the cyber attacker's LAN respectively.

iii. Using a diminutive TCP/UDP payload packet scheme, whereby relatively small-sized TCP packets (max. of 1,000 bytes) and UDP datagrams (max. of 400 bytes) are formulated, generated, and enveloped for each cyberbot's or cyber spider's payload. For example, in certain scenarios, payloads that are required to conduct active and passive fingerprinting behind the cyber attacker's firewall should be relatively small, in order to avoid being detected by instituted information security controls. In this case, the omelette-egg-hunter-shellcode scheme (presented in the $3^{rd}$ phase of cracking-the-perimeter episode as outlined under Cyber Threat Assessment Module section of the Artificial Intelligence Layer heading) is used as a strategy to circumvent encountered information security controls instituted by the cyber attacker's security-based components (e.g., firewall, HIDS/HIPS, etc.).

iv. Using an ICMP covert channel (i.e., ICMP tunneling) scheme to assist in bypassing encountered or discovered information security controls such as firewalls, HIDS/HIPS, and/or proxy server rules via obfuscation of actual traffic based on the TCP/UDP packet scheme mentioned in process iii above. Alternatively, a system-penetration scheme based on conducting ICMP reconnaissance by using Forged ICMP Redirects to conduct Man-in-the-Middle (MitM) attacks may be instituted to extend the duration of the network- and system-SRE processes.

v. Using a hybrid or blended attack scheme that is comprised of a mashup of Low-bandwidth (LB) Denial of Service (DoS) and Operator-fatigue (OF) attacks to promote obfuscation of actual traffic, in order to circumvent encountered or discovered information security controls instituted by the cyber attacker's aforementioned networked security-based components mentioned in d).

vi. Using the originally-created AI/ML-based Drive-by cyberbots, liaised by the CSE, to setup backdoors and subsequent secure covert communications links between the cyber attacker's targeted hardware and the OCA, prior to commencing with the network- and system-SRE processes.

Other primary objectives of the CAM are to:
i. Determine which of the flagged and cached TCCs are viable options and aggregate them into a unified abstract or virtual TCM.
ii. Facilitate the continuous monitoring of communications between all deployed cyberbots and liaised those communications' parameters between the specifically assigned ImCDs and the deployed cyberbots (as illustrated by data flows 6, 7, 10, 11, 12, 15, 16 20, 21, 24, 25, 26, and 29 in FIGS. 2 and 3).
iii. Relay information associated with the status of deployed cyberbots (illustrated as data flows 7, 12, 21, and 26 in FIGS. 2 and 3), exfiltrated SRE data (illustrated by data flow 17 in FIGS. 2 and 3), and the CWS (illustrated as data flows 22 and 27 in FIGS. 2 and 3) to the CSE.
iv. Act as a temporary storage holding area for particular cyberbots prior to being deployed (illustrated as data flows 9, 14, 19, 23 and 28 in FIGS. 2 and 3).
v. Solicit the CSE to perform specific assessments, in order to determine why certain functions associated with the deployed cyberbots failed—consequently resulting in the CSE autonomically formulating viable solutions (illustrated as data flows 8 and 13 in FIGS. 2 and 3) to remedy these failures.
vi. Liaise with and relay to the CSE the status of particular processes. For example, to reliably assess whether deployed cyberbots have successfully completed their programmed tasks or functions, the ImCDs are programmed to institute a synchronous low-frequency heartbeat-and-keep-alive scheme, in order to effectively monitor the operational activeness of those deployed cyberbots. Additionally, the CAM is programmed to assess the performance and operational states of the deployed AI/ML-based cyberbots via their transmitted and received ACK packets.
vii. Assist in updating the CSE and ODBMS accordingly on issues relating to performance and operations associated with all deployed AI/ML-based cyberbots.

3) Database (DB) Layer

The database layer is comprised of a Java-based Object-oriented Database Management System (ODBMS) that is integrated into the Java Database Connectivity (JDBC) Application Programming Interface (API). This ODBMS is based on the Real-Time Object-Oriented Database Architecture for Intelligent Networks (RODAIN) management system model. The RODAIN model is a memory-based Object-oriented Database Management System (ODBMS) that was developed using the Java Platform Enterprise Edition (Java EE) application and Real-Time Specification for Java (RTSJ) modules. Other tools such as the Java Development Kit (JDK) and its associated Java Virtual Machine (JVM) and class libraries included in the Java Runtime Environment (JRE) are also used in the development of the RODAIN-based ODBMS.

The OCA uses the RODAIN-based ODBMS to store all system generated objects, data, files, and logs. For example, the ODBMS is used for specifically storing the following: 1) All system generated cyberbots, 2) Cyber-threat-intelligence analytics, 3) Syslog generated logs and logs associated with the CTAM's autonomous hybrid HIDS/HIPS/SIEM-IPTM, 4) CWSs, 5) APT-based CoCs, 6) logical restore, rollback, and backup points of the ODBMS and the entire system, 7) all data derived from and associated with the PRE and SRE procedures or missions, 8) updated CVSS metrics, and 9) the results produced by the data-mining operations (e.g., analytics associated with the cyber attacker and associated hardware, including tactical, strategic, cyber threat intelligence, and network- and system-vulnerability reconnaissance and enumeration analytics).

The RODAIN-based ODBMS model was incorporated into the OCA's design, because of its ability to promote high predictability and temporal consistency with high-performance concurrent-control outputted metrics in real time.

Similar to the CTAM, CSE and CAM, the RODAIN-based ODBMS is designed to operate in a designated virtualized environment consisting of multiple, horizontal-scalable, synchronized VMs. However, these VMs are formulized by the JDK's JVM module instead of the SELinux's KVM module.

How does My Novel Proposed Invention (the OCA) Differs from Already Similar Inventions?

Similar inventions are commonly based on a defensive stratagem (either the conventional Layered-Defense or the Defense-in-Depth strategy), whereas the Payne OCA is based on an offensive stratagem that exhibits the following characteristics:
i. It is an autonomous smart network appliance that is grounded on an AI/ML-based information-security exemplar with integrated modularized and virtualized dynamically scalable plug-and-play technologies. Moreover, the OCA's logistical operation is based on an "offensive information-security stratagem". This offensive information-security stratagem is in contrast to the conventional "defensive information-security strategy" facilitated by the standardized "Layered-Defense" and "Defense-in-Depth" cyber-security approaches generally used to mitigate cyber threats such as cyber attacks.

ii. Its AI engine is based on an autonomous, hybrid (three-tier), AI/ML-based ANN architecture (a combination of AANN, CCANN, and DQN), which the OCA uses to promote machine-, deep-, and self-learning directives; this is in contrast to conventional AI-ML-based devices, which typically use a one-tier AI/ML-based architecture.

iii. Its sole purpose is to make malicious cyber activities such as hacking costly for cybercriminals, by instituting a target-and-neutralize directive aimed at discovering and destroying the networked devices interconnected to those cybercriminals' LANs. The OCA uses this target-and-neutralize directive as opposed to using a conventional Malware-countermeasure (e.g., a penetration attack) or defensive-countermeasure (Layered-Defense or Defense-in-Depth) directive, which would leave a cyber attacker's networked devices intact and still functional.

iv. It is designed to be a modularized, auto-scalable, elastic appliance that can automatically increase or decrease its resources exponentially on demand, based on the magnitude of the instituted cyber attacks. Scalability and elasticity is achieved via the OCA's ability to autonomically expand and reduce the number of VMs required to effectively carry out its operational directives. Moreover, scalability is also achieved by simply increasing the number of Master Nodes, Compute Nodes, and InfiniBand-Switch modules, which the OCA automatically configures by using its intrinsic plug-and-play architecture.

For instance, the OCA can be retooled to massively scale in order to handle high-capacity cyber attacks emanating from states, companies, or distributed systems by simply increasing the Master Nodes, Compute Nodes, and InfiniBand-Switch modules using its inherent plug-and-play architecture. Examples of the uses for the OCA may include the following: 1) Military applications, 2) Security of critical IT-based infrastructures owned by commercial, federal, and state entities or governments, and 3) National-security initiatives such as compiling profiles of malicious-threat actors that can be used to antecedently identify potential cyber-terrorism threats posed by these parties.

v. The cyber attacker's preliminary profile generated by the OCA's CTAM is primarily based on cognitive human behavioral patterns and trends (e.g., analytics based on intent, motivation, capacity, and TTPs). This profile is derived from using a plethora of data-mining techniques as opposed to the conventional signatures-based approach (i.e., a pattern or series of bytes in a file or network traffic or anomalies identified in network privileges, network access, or directory access) commonly used to identify a cyber attacker's digital footprint.

The cognitive human behavioral analytics, derived from the cognitive human behavioral patterns and trends, incorporates aspects of the Case Linkage Theory to uniquely identify a cyber attacker's digital cognitive-behavioral signature as part of the profile creation process. For example, the precipitation of the TTP parameters would involve identifying the navigation (how the cyber attacker maneuvers through a Honeynet), enumeration (how the cyber attacker systematically discovers metrics associated with the Honeynet's components), and exploitation (how the cyber attacker systematically escalates privileges to steal data) methodologies used by a cyber attacker. After which, the OCA's CSE subsequently applies a vast array of data-mining operations to the aforementioned TTP parameters to generate a digital cognitive behavioral fingerprint for a particular cyber attacker.

vi. Its intrinsic properties are similar to an Electro Magnetic Pulse (EMP) Cyber-Warfare device, which is designed to use conventional amplified electromagnetic energy. Contrarily, the OCA is engineered to use custom-developed software and a system-generated virtual Internet-based TCM as a communicative conduit to target and destroy electronic devices' circuitries associated with a cyber attacker's hardware.

vii. All cyberbots described in the invention are designed to autonomously expunge any generated digital footprints, traces or dust (self or otherwise) and successively disintegrate (self-destruct) upon ultimately completing their designated assigned missions (i.e., to obliterate a cyber attacker's computer system used to instigate the cyber attack, discovered peripheral smart devices, and network-edge device interconnected to the cyber attacker's LAN respectively. For example, expunging digital footprints, traces, or dust may be accomplished by having the cyberbots' polymorphic-shellcode payloads destroy or corrupt all associated metadata.

What are Some of the Alternate Approaches?

a) Layered-Defense and Defense-in-Depth strategies are the two most prominent conventional approaches used in the information security industry. However, these approaches are based on a defensive exemplar. Furthermore, successful cyber attacks against organizations such as RSA, the United States Military, Solar-Winds, Twitter, Zoom, Yahoo, Sony, Facebook, Colonial pipeline, NBA, Microsoft, and many others are examples of how the Layered-Defense and Defense-in-Depth strategies have become impractical, unsustainable, and indefensible.

b) "U.S. Pat. No. 9,215,208 B2", which is also based on an offensive cybersecurity strategy. However, the model outlined in this patent is based on a conventional network architecture as opposed to the autonomous AI/ML-based network architecture constituted by the Payne OCA.

Furthermore, the proposed network attack offensive appliance outlined in "U.S. Pat. No. 9,215,208 B2" does not render a cyber attacker's hardware inoperable by destroying electronics components associated with those hardware (i.e., system used to instigate the cyber attack, discovered smart devices, and network-edge device such as a modem-router interconnected to the cyber attacker's LAN). Instead, it uses traffic flow termination and/or jamming, botnet capture and taking control of a botnet threat to turn it into an attacker of the offending botnet controller, disinformation, and DNS request capture/DNS request rewrite to reroute IP traffic away from an identified botnet, in an effort to neutralize a cyber attack.

c) Computer-based penetration attacks instigated by a person, group, companies, distributed systems, states, or other stakeholders used to compromise networks and/or hosts via discovered exploitable vulnerabilities associated with those networks and/or hosts. However, this model requires a person or persons to facilitate and instigate the cyber attack. For example, most penetration-attack methods are typically carried out by professional hackers utilizing specialized penetrative tools and techniques.

Those having ordinary skill in the art and access to the present teachings will recognize additional modifications, applications and embodiments within the scope thereof.

It is therefore intended by the appended claims to cover any and all such applications, modifications and embodiments within the scope of the present invention accordingly.

What is claimed is:

1. An offensive cybersecurity appliance implemented with a first system comprising:
   a microprocessor and
   software stored in a non-transitory computer readable medium for execution by the microprocessor to provide:
      a cyber threat assessment module for assessing an incoming cyber threat to a second system and providing a profile of a cyber attacker associated with the threat; and
      a cyber spider engine operationally coupled to the cyber threat assessment module for generating at least one offensive cyber spider with a destructive payload by which the cyber spider counterattacks systems of the cyber attacker and permanently disables one or more hardware components of the cyber attacker's system by causing at least one microelectronic component thereof to overheat; wherein the cyber spider uses one of micro-probing, overvolting, or overclocking to cause said overheating of said at least one microelectronic component.

2. The invention of claim 1 wherein the first system includes a cyber attack module for providing a transport or communications channel to enable the cyber spider to attack the cyber attacker's system.

3. The invention of claim 1 wherein the cyber spider engine generates one or more cyber spiders that permanently disable said one or more hardware components of the cyber attacker's system and subsequently expunges the cyber spider's digital footprints throughout the cyber attacker's system.

4. The invention of claim 3 wherein the cyber spider is designed to self destruct after expunging said digital footprints.

5. An offensive cyber security method including the steps of:
   providing a first system having a processor;
   commanding the processor to execute software effective to assess an incoming cyber threat to a second system from a cyber attacker;
   generating at least one offensive cyber spider with a destructive payload by which the cyber spider counterattacks systems of the cyber attacker and permanently disables one or more hardware components of the cyber attacker's system by causing at least one microelectronic component thereof to overheat; wherein the cyber spider uses one of micro-probing, overvolting, or overclocking to cause said overheating of said at least one microelectronic component; and
   transporting the cyber spider to the attacker's system to enable the cyber spider to attack the cyber attacker's system.

* * * * *